US012677239B2

(12) United States Patent
Li et al.

(10) Patent No.: US 12,677,239 B2
(45) Date of Patent: Jul. 7, 2026

(54) POSITIONING METHOD AND APPARATUS, AND STORAGE MEDIUM

(71) Applicant: DATANG MOBILE COMMUNICATIONS EQUIPMENT CO., LTD., Beijing (CN)

(72) Inventors: Hui Li, Beijing (CN); Bin Ren, Beijing (CN); Ren Da, Beijing (CN); Xiaotao Ren, Beijing (CN); Zheng Zhao, Beijing (CN)

(73) Assignee: DATAND MOBILE COMMUNICATIONS EQUIPMENT CO., LTD., Beijing (CN)

( * ) Notice: Subject to any disclaimer, the term of this patent is extended or adjusted under 35 U.S.C. 154(b) by 297 days.

(21) Appl. No.: 18/552,663

(22) PCT Filed: Apr. 2, 2022

(86) PCT No.: PCT/CN2022/085154
§ 371 (c)(1),
(2) Date: Sep. 26, 2023

(87) PCT Pub. No.: WO2022/206999
PCT Pub. Date: Oct. 6, 2022

(65) Prior Publication Data
US 2024/0373390 A1 Nov. 7, 2024

(30) Foreign Application Priority Data
Apr. 2, 2021 (CN) .......................... 202110362442.0

(51) Int. Cl.
*H04W 64/00* (2009.01)
*H04L 5/00* (2006.01)
*H04W 24/10* (2009.01)

(52) U.S. Cl.
CPC ........... *H04W 64/00* (2013.01); *H04L 5/0051* (2013.01); *H04W 24/10* (2013.01)

(58) Field of Classification Search
CPC ...... H04W 64/00; H04W 24/10; H04L 5/0051
(Continued)

(56) References Cited

U.S. PATENT DOCUMENTS

2020/0154240 A1* 5/2020 Edge ..................... H04W 4/029
2020/0267684 A1 8/2020 Huang et al.
2021/0088623 A1 3/2021 Yerramalli et al.

FOREIGN PATENT DOCUMENTS

CN 111562546 A 8/2020
CN 111837355 A 10/2020
(Continued)

OTHER PUBLICATIONS

European Patent Office, Extended European Search Report Issued in Application No. 22779179.5, Jul. 22, 2024, Germany, 13 pages.
(Continued)

*Primary Examiner* — Michael R Neff
(74) *Attorney, Agent, or Firm* — KILPATRICK TOWNSEND & STOCKTON LLP

(57) ABSTRACT

The present application provides a positioning method and apparatus, and a storage medium, the method includes: a terminal receiving PRSs from multiple access network devices, each access network device corresponding to multiple PRSs; for each access network device, the terminal determining at least two target PRS resources that are spatially adjacent among PRS resources for transmitting the multiple PRSs of the access network device; and the terminal sending measurement results of the target PRS resources to a location server, the measurement result of the target PRS resource being used for instructing the location server to determine location information of the terminal.

18 Claims, 14 Drawing Sheets

(58) Field of Classification Search
USPC ...................................................... 455/456.1
See application file for complete search history.

(56) References Cited

FOREIGN PATENT DOCUMENTS

| | | | |
|---|---|---|---|
| CN | 112188541 | A | 1/2021 |
| CN | 112351488 | A | 2/2021 |
| CN | 112399330 | A | 2/2021 |
| WO | 2021000951 | A1 | 1/2021 |
| WO | 2021008581 | A1 | 1/2021 |

OTHER PUBLICATIONS

Huawei et al., "Enhancement for DL AoD positioning", 3GPP TSG RAN WG1 Meeting #104-e, E-meeting, Jan. 25-Feb. 5, 2021, total 6 pages, R1-2100238.
State Intellectual Property Office of the People's Republic of China, Office Action and Search Report Issued in Application No. 202110362442.0, May 11, 2024, 21 pages.
ISA State Intellectual Property Office of the People's Republic of China, International Search Report and Written Opinion Issued in Application No. PCT/CN2022/085154, Jun. 16, 2022, WIPO, 11 pages.
Moderator (Ericsson), "FL summary #4 for AI 8.5.3 Accuracy improvements for DL-AoD positioning solutions ,"3GPP TSG-RAN WG1 Meeting #103-e, e-Meeting, Jan. 25-Feb. 5, 2021, total 69 pages, R1-2102181.
Patent Office of Taiwan, Office Action Issued in Application No. 111113035, Apr. 28, 2023, 9 pages.

\* cited by examiner

POSITIONING METHOD AND APPARATUS, AND STORAGE MEDIUM

CROSS-REFERENCE TO RELATED APPLICATION

This application is a National stage of International Application No. PCT/CN2022/085154, filed on Apr. 2, 2022, which claims priority to Chinese Patent Application No. 202110362442.0, entitled "POSITIONING METHOD AND APPARATUS, AND STORAGE MEDIUM", filed with the China National Intellectual Property Administration on Apr. 2, 2021, both of the aforementioned applications are hereby incorporated by reference in their entireties.

FIELD

The present application relates to the field of communication, and in particular, to a positioning method and apparatus, and a storage medium.

BACKGROUND

In the communication system, the new radio (NR) positioning technology includes the uplink positioning technology and the downlink positioning technology. The downlink angle of departure (DL-AoD) positioning technology is one of the downlink positioning technologies of NR.

In the DL-AoD positioning technology, each transmission and reception point (TRP) on a network side sends multiple positioning reference signals (PRS), and respective PRS point to different directions after being formed by PRS resources. Based on a received PRS, a terminal measures a reference signal received power (RSRP) of a corresponding PRS resource, and feeds back RSRPs of multiple PRS resources to a location server on the network side, and the location server on the network side determines location information of the terminal.

Currently, when feeding back the RSRP of the PRS resource to the network side, the terminal will select a PRS resource with a relatively larger RSRP to report. However, the inventor finds in the research process that the solution of determining the location information of the terminal based on the PRS resource with the relatively larger RSRP has low positioning accuracy.

SUMMARY

The present application provides a positioning method and apparatus, and a storage medium, which are used for improving the positioning accuracy of a terminal in the communication system.

In one embodiment of the present application provides a positioning method, which is applied to a terminal and includes:

receiving positioning reference signals (PRSs) from multiple access network devices, where each access network device corresponds to multiple PRSs;

for each access network device, determining at least two target PRS resources that are spatially adjacent among PRS resources for transmitting the multiple PRSs of the access network device;

sending measurement results of the target PRS resources to a location server, the measurement result of the target PRS resource is used for instructing the location server to determine location information of the terminal.

In one embodiment, for each access network device, the determining the at least two target PRS resources that are spatially adjacent among the PRS resources for transmitting the multiple PRSs of the access network device includes:

for each access network device, determining a spatial arrangement order of the multiple PRS resources of the access network device;

determining the target PRS resources among the multiple PRS resources of the access network device according to the spatial arrangement order of the multiple PRS resources of the access network device.

In one embodiment, for each access network device, the determining the spatial arrangement order of the multiple PRS resources of the access network device includes:

for each access network device, acquiring the spatial arrangement order of the multiple PRS resources of the access network device from configuration information of the access network device.

In one embodiment, for each access network device, identifiers of the multiple PRS resources of the access network device are associated with the spatial arrangement order of the multiple PRS resources of the access network device, for each access network device, the determining the at least two target PRS resources that are spatially adjacent among the PRS resources for transmitting the multiple PRSs of the access network device includes:

for each access network device, acquiring the identifiers of the multiple PRS resources of the access network device from configuration information of the access network device;

determining the target PRS resources according to the identifiers of the multiple PRS resources of the access network device.

In one embodiment, for each access network device, the determining the spatial arrangement order of the multiple PRS resources of the access network device includes:

for each access network device, acquiring angle information of the multiple PRS resources of the access network device from configuration information of the access network device;

determining the spatial arrangement order of the multiple PRS resources of the access network device according to the angle information of the multiple PRS resources of the access network device;

where the angle information of the PRS resource includes a horizontal dimension angle of the PRS resource and/or a vertical dimension angle of the PRS resource.

In one embodiment, for each access network device, the determining the spatial arrangement order of the multiple PRS resources of the access network device includes:

for each access network device, determining AoAs of the multiple PRS resources of the access network device;

determining the spatial arrangement order of the multiple PRS resources of the access network device according to the AoAs of the multiple PRS resources of the access network device.

In one embodiment, a measurement result of the PRS resource includes an RSRP of the PRS resource and whether a transmission channel corresponding to the RSRP of the PRS resource belongs to a LOS path.

In one embodiment, for each access network device, the determining the at least two target PRS resources that are spatially adjacent among the PRS resources for transmitting the multiple PRSs of the access network device further includes:

receiving a first message from the location server, where the first message is used for indicating a preset condition that PRS resources whose measurement results are to be reported should meet;

determining the target PRS resources according to the first message.

In one embodiment, the preset condition is identifiers of the PRS resources whose measurement results are to be reported, the determining the target PRS resources according to the first message includes:

determining that the target PRS resources are PRS resources corresponding to the identifiers of the PRS resources whose measurement results are to be reported among the multiple PRS resources of the access network device.

In one embodiment, the preset condition is that attribute values of the PRS resources whose measurement results are to be reported meet a preset threshold, the determining the target PRS resources according to the first message includes:

determining the target PRS resources according to a spatial arrangement order of the multiple PRS resources among the multiple PRS resources of the access network device; and screening, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, the preset condition is that the PRS resources whose measurement results are to be reported are not limited by spatial adjacency, determining the target PRS resources according to the first message includes:

screening the target PRSs according to qualities of PRSs transmitted by the target PRS resources.

In one embodiment, the preset condition is that the PRS resources whose measurement results are to be reported are limited by spatial adjacency, before receiving the first message from the location server, the positioning method further includes:

sending a second message to the location server, where the second message is used for indicating that the terminal supports measurement of an AoA of a PRS resource.

In one embodiment, the first message is further used for indicating to the terminal a reported number of spatially adjacent PRS resources.

In one embodiment, the determining the target PRS resources among the multiple PRS resources of the access network device according to the spatial arrangement order of the multiple PRS resources of the access network device includes:

determining a first PRS resource among the multiple PRS resources of the access network device;

determining one or more second PRS resources for the first PRS resource;

determining that the target PRS resources are the first PRS resource and the second PRS resource.

In one embodiment, before sending the measurement results of the target PRS resources to the location server, the positioning method further includes:

receiving a third message from the location server, where the third message is used for indicating a reported number of the first PRS resource and/or a reported number of the second PRS resource.

In one embodiment, before receiving the PRSs from the multiple access network devices, the positioning method further includes:

receiving a fourth message from the location server, where the fourth message includes configuration information of the multiple access network devices;

where the configuration information of the access network device includes at least one of the following: a spatial arrangement order of the multiple PRS resources of the access network device, identifiers of the multiple PRS resources of the access network device, or angle information of the multiple PRS resources of the access network device, and the angle information of the PRS resource includes a horizontal dimension angle of the PRS resource and/or a vertical dimension angle of the PRS resource.

In one embodiment of an embodiment of the present application provides a positioning method, which is applied to a location server and includes:

receiving measurement results of target PRS resources of multiple access network devices from a terminal, where the target PRS resources of the access network device are spatially adjacent;

determining location information of the terminal according to the measurement results of the target PRS resources and angle information of the target PRS resources, where the angle information of the target PRS resource includes a horizontal dimension angle of the target PRS resource and/or a vertical dimension angle of the target PRS resource.

In one embodiment, before receiving the measurement results of the target PRS resources of the multiple access network devices from the terminal, the method further includes:

sending a first message to the terminal, where the first message is used for indicating a preset condition that PRS resources whose measurement results are to be reported should meet;

where the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; where the attribute value includes at least one of the following: a signal-to-interference-plus-noise ratio, a signal-to-noise ratio, or an RSRP.

In one embodiment, the preset condition is that the PRS resources whose measurement results are to be reported are limited by the spatial adjacency, before sending the first message to the terminal, the method further includes:

receiving a second message from the terminal, where the second message is used for indicating that the terminal supports measurement of an AoA of a PRS resource.

In one embodiment, a measurement result of the PRS resource includes an RSRP of the PRS resource and whether a transmission channel corresponding to the RSRP of the PRS resource belongs to a LOS path.

In one embodiment, the first message is further used for indicating to the terminal a reported number of spatially adjacent PRS resources.

In one embodiment, before receiving the measurement results of the target PRS resources of the multiple access network devices from the terminal, the method further includes:

sending a fourth message to the terminal, where the fourth message includes configuration information of the multiple access network devices, the configuration information of the access network device includes at least one of the following: a spatial arrangement order of multiple PRS resources of the access network device, identifiers of the multiple PRS resources of the access network device, or angle information of the multiple PRS resources of the access network device.

In one embodiment, before sending the fourth message to the terminal, the method further includes:

receiving a fifth message sent by the access network device, where the fifth message includes the configuration information of the access network device.

In one embodiment of an embodiment of the present application provides a positioning method, which is applied to an access network device and includes:

sending a fifth message to a location server, where the fifth message includes configuration information of the access network device, the configuration information of the access network device includes at least one of the following: a spatial arrangement order of multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment, the identifiers of the multiple PRS resources are associated with the spatial arrangement order of the multiple PRS resources.

In one embodiment of an embodiment of the present application provides a positioning apparatus, which is applied to a terminal and includes a memory, a transceiver and a processor;

the memory is configured to store a computer program;

the transceiver is configured to transmit and receive data under control of the processor; and the processor is configured to read the computer program in the memory and perform following operations;

receiving PRSs from multiple access network devices, where each access network device corresponds to multiple PRSs;

for each access network device, determining at least two target PRS resources that are spatially adjacent among PRS resources for transmitting the multiple PRSs of the access network device;

sending measurement results of the target PRS resources to a location server, where the measurement result of the target PRS resource is used for instructing the location server to determine location information of the terminal.

In one embodiment, the processor is further configured to perform the following operations: for each access network device, determining a spatial arrangement order of the multiple PRS resources of the access network device; determining the target PRS resources among the multiple PRS resources of the access network device according to the spatial arrangement order of the multiple PRS resources of the access network device.

In one embodiment, the processor is further configured to perform the following operations: for each access network device, acquiring the spatial arrangement order of the multiple PRS resources of the access network device from configuration information of the access network device.

In one embodiment, for each access network device, identifiers of the multiple PRS resources of the access network device are associated with the spatial arrangement order of the multiple PRS resources of the access network device, the processor is further configured to perform the following operations: for each access network device, acquiring the identifiers of the multiple PRS resources of the access network device from configuration information of the access network device; determining the target PRS resources according to the identifiers of the multiple PRS resources of the access network device.

In one embodiment, the processor is further configured to perform the following operations: for each access network device, acquiring angle information of the multiple PRS resources of the access network device from configuration information of the access network device; determining the spatial arrangement order of the multiple PRS resources of the access network device according to the angle information of the multiple PRS resources of the access network device; where the angle information of the PRS resource includes a horizontal dimension angle of the PRS resource and/or a vertical dimension angle of the PRS resource.

In one embodiment, the processor is further configured to perform the following operations: for each access network device, determining AoAs of the multiple PRS resources of the access network device; determining the spatial arrangement order of the multiple PRS resources of the access network device according to the AoAs of the multiple PRS resources of the access network device.

In one embodiment, a measurement result of the PRS resource includes an RSRP of the PRS resource and whether a transmission channel corresponding to the RSRP of the PRS resource belongs to a LOS path.

In one embodiment, the processor is further configured to perform the following operations: receiving a first message from the location server, where the first message is used for indicating a preset condition that PRS resources whose measurement results are to be reported should meet; determining the target PRS resources according to the first message.

In one embodiment, the preset condition is identifiers of the PRS resources whose measurement results are to be reported, the processor is further configured to perform the following operations: determining that the target PRS resources are PRS resources corresponding to the identifiers of the PRS resources whose measurement results are to be reported among the multiple PRS resources of the access network device.

In one embodiment, the preset condition is that attribute values of the PRS resources whose measurement results are to be reported meet a preset threshold, the processor is further configured to perform the following operations: determining the target PRS resources according to a spatial arrangement order of the multiple PRS resources among the multiple PRS resources of the access network device; and screening, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, the preset condition is that the PRS resources whose measurement results are to be reported are not limited by spatial adjacency, the processor is further configured to perform the following operations: screening the target PRSs according to qualities of PRSs transmitted by the target PRS resources.

In one embodiment, the preset condition is that the PRS resources whose measurement results are to be reported are limited by spatial adjacency, the processor is further configured to perform the following operations: sending a second message to the location server, where the second message is used for indicating that the terminal supports measurement of an AoA of a PRS resource.

In one embodiment, the first message is further used for indicating to the terminal a reported number of spatially adjacent PRS resources.

In one embodiment, the processor is further configured to perform the following operations: determining a first PRS resource among the multiple PRS resources of the access network device; determining one or more second PRS resources for the first PRS resource; determining that the target PRS resources are the first PRS resource and the second PRS resource.

In one embodiment, the processor is further configured to perform the following operations: receiving a third message from the location server, where the third message is used for indicating a reported number of the first PRS resource and/or a reported number of the second PRS resource.

In one embodiment, the processor is further configured to perform the following operations: receiving a fourth message from the location server, where the fourth message includes configuration information of the multiple access network devices;

where the configuration information of the access network device includes at least one of the following: a spatial arrangement order of the multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment of an embodiment of the present application provides a positioning apparatus, which is applied to a location server and includes a memory, a transceiver and a processor;

the memory is configured to store a computer program;

the transceiver is configured to transmit and receive data under control of the processor; and the processor is configured to read the computer program in the memory and perform following operations:

receiving measurement results of target PRS resources of multiple access network devices from a terminal, where the target PRS resources of the access network device are spatially adjacent;

determining location information of the terminal according to the measurement results of the target PRS resources and angle information of the target PRS resources, where the angle information of the target PRS resource includes a horizontal dimension angle of the target PRS resource and/or a vertical dimension angle of the target PRS resource.

In one embodiment, the processor is further configured to perform the following operations: sending a first message to the terminal, where the first message is used for indicating a preset condition that PRS resources whose measurement results are to be reported should meet; where the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; where the attribute value includes at least one of the following: a signal-to-interference-plus-noise ratio, a signal-to-noise ratio, or an RSRP.

In one embodiment, the preset condition is that the PRS resources whose measurement results are to be reported are limited by the spatial adjacency, the processor is further configured to perform the following operations: receiving a second message from the terminal, where the second message is used for indicating that the terminal supports measurement of an AoA of a PRS resource.

In one embodiment, a measurement result of the PRS resource includes an RSRP of the PRS resource and whether a transmission channel corresponding to the RSRP of the PRS resource belongs to a LOS path.

In one embodiment, the first message is further used for indicating to the terminal a reported number of spatially adjacent PRS resources.

In one embodiment, the processor is further configured to perform the following operations: sending a fourth message to the terminal, where the fourth message includes configuration information of the multiple access network devices, the configuration information of the access network device includes at least one of the following: a spatial arrangement order of multiple PRS resources of the access network device, identifiers of the multiple PRS resources of the access network device, or angle information of the multiple PRS resources of the access network device.

In one embodiment, the processor is further configured to perform the following operations: receiving a fifth message sent by the access network device, where the fifth message includes the configuration information of the access network device.

In one embodiment of an embodiment of the present application provides a positioning apparatus, which is applied to an access device and includes a memory, a transceiver and a processor;

the memory is configured to store a computer program;

the transceiver is configured to transmit and receive data under control of the processor; and the processor is configured to read the computer program in the memory and perform following operations:

sending a fifth message to a location server, where the fifth message includes configuration information of the access network device, the configuration information of the access network device includes at least one of the following: a spatial arrangement order of multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment, the identifiers of the multiple PRS resources are associated with the spatial arrangement order of the multiple PRS resources.

In one embodiment of an embodiment of the present application provides a positioning apparatus, which is applied to a terminal and includes:

a receiving device, configured to receive PRSs from multiple access network devices, where each access network device corresponds to multiple PRSs;

a determining device, configured to, for each access network device, determine at least two target PRS resources that are spatially adjacent among PRS resources for transmitting the multiple PRSs of the access network device;

a sending device, configured to send measurement results of the target PRS resources to a location server, where the measurement result of the target PRS resource is used for instructing the location server to determine location information of the terminal.

In one embodiment, the determining device is configured to: for each access network device, determine a spatial arrangement order of the multiple PRS resources of the access network device; determine the target PRS resources among the multiple PRS resources of the access network device according to the spatial arrangement order of the multiple PRS resources of the access network device.

In one embodiment, the determining device is configured to: for each access network device, acquire the spatial arrangement order of the multiple PRS resources of the access network device from configuration information of the access network device.

In one embodiment, for each access network device, identifiers of the multiple PRS resources of the access network device are associated with the spatial arrangement order of the multiple PRS resources of the access network device, the determining device is configured to: for each access network device, acquire the identifiers of the multiple PRS resources of the access network device from configuration information of the access network device; and determine the target PRS resources according to the identifiers of the multiple PRS resources of the access network device.

In one embodiment, the determining device is configured to: for each access network device, acquire angle information of the multiple PRS resources of the access network device from configuration information of the access network device; and determine the spatial arrangement order of the multiple PRS resources of the access network device according to the angle information of the multiple PRS resources of the access network device; where the angle information of the PRS resource includes a horizontal dimension angle of the PRS resource and/or a vertical dimension angle of the PRS resource.

In one embodiment, the determining device is configured to: for each access network device, determine AoAs of the multiple PRS resources of the access network device; and determine the spatial arrangement order of the multiple PRS resources of the access network device according to the AoAs of the multiple PRS resources of the access network device.

In one embodiment, a measurement result of the PRS resource includes an RSRP of the PRS resource and whether a transmission channel corresponding to the RSRP of the PRS resource belongs to a LOS path.

In one embodiment, the receiving device is further configured to: receive a first message from the location server, where the first message is used for indicating a preset condition that PRS resources whose measurement results are to be reported should meet.

At this point, the positioning apparatus further includes:
a screening device, configured to determine the target PRS resources according to the first message.

In one embodiment, the preset condition is identifiers of the PRS resources whose measurement results are to be reported, the screening device is configured to: determine that the target PRS resources are PRS resources corresponding to the identifiers of the PRS resources whose measurement results are to be reported among the multiple PRS resources of the access network device.

In one embodiment, the preset condition is that attribute values of the PRS resources whose measurement results are to be reported meet a preset threshold, the screening device, configured to: determine the target PRS resources according to a spatial arrangement order of the multiple PRS resources among the multiple PRS resources of the access network device; and screen, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, the preset condition is that the PRS resources whose measurement results are to be reported are not limited by spatial adjacency, the screening device is configured to: screen the target PRSs according to qualities of PRSs transmitted by the target PRS resources.

In one embodiment, the preset condition is that the PRS resources whose measurement results are to be reported are limited by spatial adjacency, the sending device is further configured to: send a second message to the location server, where the second message is used for indicating that the terminal supports measurement of an AoA of a PRS resource.

In one embodiment, the first message is further used for indicating to the terminal a reported number of spatially adjacent PRS resources.

In one embodiment, the determining device is configured to: determine a first PRS resource among the multiple PRS resources of the access network device; determine one or more second PRS resources for the first PRS resource; determine that the target PRS resources are the first PRS resource and the second PRS resource.

In one embodiment, the receiving device is further configured to: receive a third message from the location server, where the third message is used for indicating a reported number of the first PRS resource and/or a reported number of the second PRS resource.

In one embodiment, the receiving device is further configured to: receive a fourth message from the location server, where the fourth message includes configuration information of the multiple access network devices; where the configuration information of the access network device includes at least one of the following: a spatial arrangement order of the multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment of the present application provides a positioning apparatus, which is applied to a location server and includes:

a receiving device, configured to receive measurement results of target PRS resources of multiple access network devices from a terminal, where the target PRS resources of the access network device are spatially adjacent;

a positioning device, configured to determine location information of the terminal according to the measurement results of the target PRS resources and angle information of the target PRS resources, where the angle information of the target PRS resource includes a horizontal dimension angle of the target PRS resource and/or a vertical dimension angle of the target PRS resource.

In one embodiment, the positioning apparatus further includes:

a sending device, configured to send a first message to the terminal, where the first message is used for indicating a preset condition that PRS resources whose measurement results are to be reported should meet; where the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; where the attribute value includes at least one of the following: a signal-to-interference-plus-noise ratio, a signal-to-noise ratio, or an RSRP.

In one embodiment, the preset condition is that the PRS resources whose measurement results are to be reported are limited by the spatial adjacency, the sending device is further configured to: receive a second message from the terminal, where the second message is used for indicating that the terminal supports measurement of an AoA of a PRS resource.

In one embodiment, a measurement result of the PRS resource includes an RSRP of the PRS resource and whether a transmission channel corresponding to the RSRP of the PRS resource belongs to a LOS path.

In one embodiment, the first message is further used for indicating to the terminal a reported number of spatially adjacent PRS resources.

In one embodiment, the sending device is further configured to: send a fourth message to the terminal, where the fourth message includes configuration information of the multiple access network devices, the configuration information of the access network device includes at least one of the following: a spatial arrangement order of multiple PRS resources of the access network device, identifiers of the multiple PRS resources of the access network device, or angle information of the multiple PRS resources of the access network device.

In one embodiment, the receiving device is further configured to: receive a fifth message sent by the access network device, where the fifth message includes the configuration information of the access network device.

In one embodiment of the present application provides a positioning apparatus, which is applied to an access network device and includes:

a sending device, configured to send a fifth message to a location server, where the fifth message includes configuration information of the access network device, the configuration information of the access network device includes at least one of the following: a spatial arrangement order of multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment, the identifiers of the multiple PRS resources are associated with the spatial arrangement order of the multiple PRS resources.

In one embodiment of the present application provides a processor-readable storage medium storing a computer program, where the computer program is configured to enable a processor to perform the positioning method as described in the embodiments.

In one embodiment of the present application provides a computer program product including an instruction; where when the instruction is run on a computer, enabling the computer to execute the method as described in the embodiments.

In one embodiment of the present application provides a communication system, including any one of the above mentioned terminal, any one of the above mentioned location server, and any one of the above mentioned access network device.

According to the present application provides a positioning method and apparatus, and a storage medium, the terminal receives the PRSs of the multiple access network devices, and determines, for each access network device, at least two target PRS resources that are spatially adjacent among the PRS resources for transmitting the multiple PRSs of the access network device; and sends the measurement results of the target PRS resources to the location server, where the measurement result of the target PRS resource is used for instructing the location server to determine location information of the terminal. In this way, since the terminal reports the measurement results of the PRS resources that are spatially adjacent to the location server, the location server can make full use of main lobe information and side lobe information of the PRS resources of the access network device in the positioning process, that is, make full use of different characteristics of the PRS resources of the access network device, thus improving the positioning accuracy of the terminal.

It should be understood that the content described in the summary is not intended to limit a key or important feature of the embodiments of the present application, nor is it intended to limit the scope of the present application. Other features of the present application will be easily understood through the following description

BRIEF DESCRIPTION OF DRAWINGS

In order to more clearly describe the embodiments of the present application, in the following, the drawings that need to be used in the description of the embodiments will be briefly introduced. Apparently, the drawings in the following description are a part of embodiments of the present application.

DESCRIPTION OF EMBODIMENTS

Figure 1:
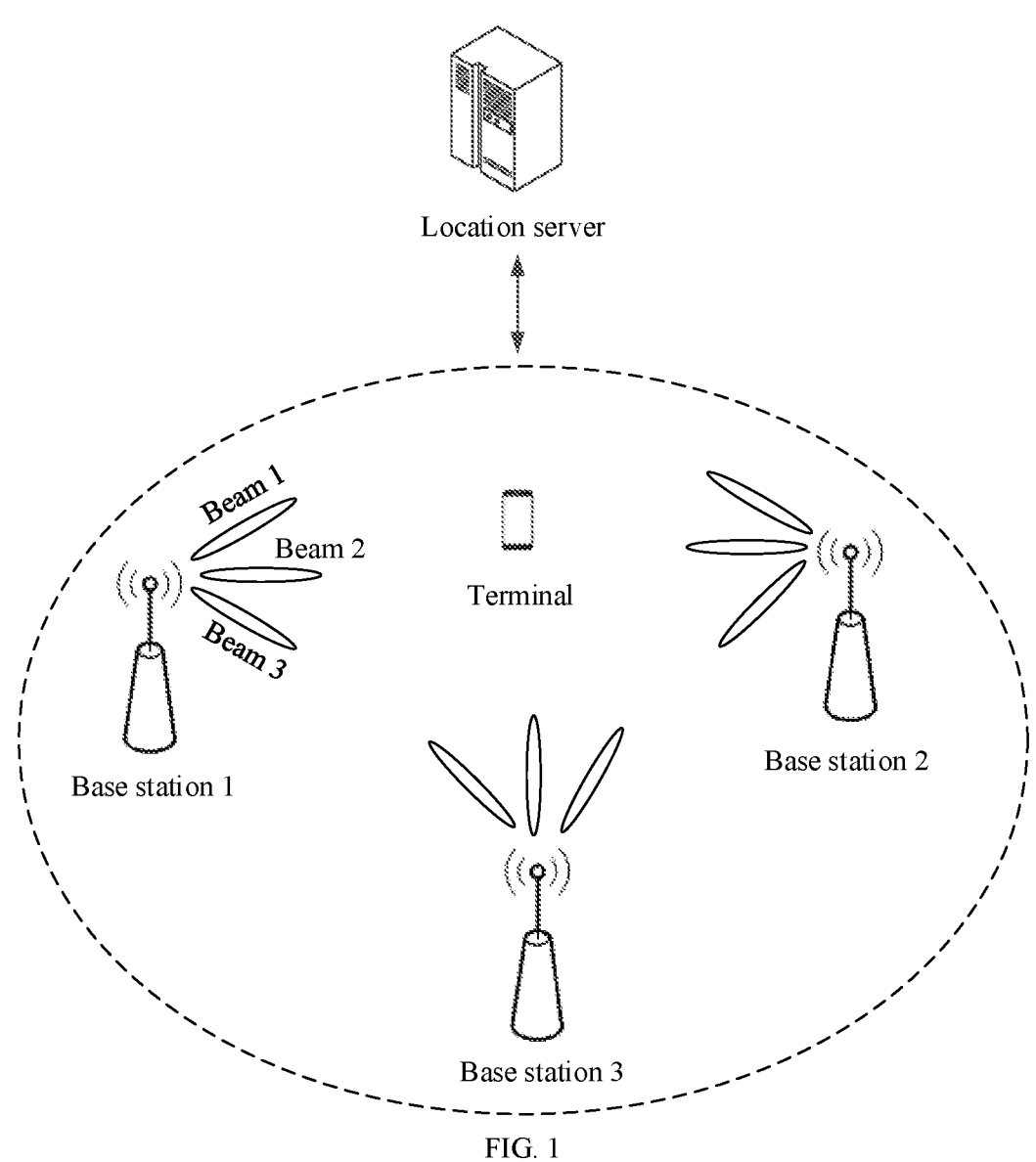
FIG. 1 is a schematic diagram of an application scenario provided by an embodiment of the present application.

The term "and/or" in the present application describes an association relationship between associated objects, indicating that there can be three kinds of relationships, for example, A and/or B, which may indicate that there are three situations: A alone, A and B simultaneously, and B alone. The character "/" generally indicates that the preceding and following associated objects are an "or" relationship.

The term "multiple" in the embodiments of the present application refers to two or more, and other quantifiers are similar.

In the following, a clear and complete description of the embodiments of the present application will be given in combination with the drawings in the embodiments of the present application. Apparently, the described embodiments are merely a part rather than all embodiments of the present application.

The embodiments of the present application may be applied to a variety of systems, especially a 5G system. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These systems include a terminal and an access network device. The systems may further include a core network part, such as a 5G system (5GS), etc. The core network part includes a location server.

The terminal involved in the embodiments of the present application may be a device that provides voice and/or data connectivity to a user, a handheld device with wireless connection functions, or other processing device connected to a wireless modem. In different systems, the names of the terminal may also be different. For example, in a 5G system, the terminal may be called as a user equipment (UE). The terminal may communicate with one or more core networks (CN) through a radio access network (RAN). The terminal may be a mobile terminal, such as, a mobile phone (or referred to as a "cellular" phone) and a computer with a mobile terminal, such as a portable, pocket, handheld, computer built-in or vehicle-mounted mobile apparatus, which exchanges language and/or data with the wireless access network. For example, a personal communication service (PCS) telephone, a cordless telephone, a session initiation protocol (SIP) telephone, a wireless local loop (WLL) station, a personal digital assistant (PDA) and other devices. The wireless terminal may also be referred to as a system, a subscriber unit, a subscriber station, a mobile station, a mobile, a remote station, an access point, a remote terminal, an access terminal, a user terminal, a user agent, a user device, which is not limited in the embodiments of the present application.

The access network device involved in the embodiments of the present application may be a base station or a transmission and reception point (TRP), and the transmission and reception point is a concept introduced in 5G, which is equivalent to a base station. The base station may include multiple cells providing services for a terminal. Depending on the specific application scenario, the base station may also be called as an access point, or may be a device in the access network that communicates with a wireless terminal through one or more sectors on the air interface, or other names. The access network device may be configured to exchange a received air frame with an Internet protocol (IP) packet, worked as a router between the wireless terminal and the rest of the access network, where the rest of the access network may include an Internet protocol (IP) communication network. The access network device may further coordinate an attribute management of an air interface. For example, the access network device involved in the embodiments of the present application may be a network device (Base Transceiver Station, BTS) in a global system for mobile communications (GSM) or a code division multiple access (CDMA), or a network device (NodeB) in a wideband code division multiple access (WCDMA), an evolutional network device (evolutionary node B, eNB or e-NodeB) in a long term evolution (LTE) system, a 5G base station (gNB) in a 5G network architecture (next generation system), or a home evolved base (Home Evolved Node B, HeNB), a relay node, a femtocell (femto), a picocell (pico), etc., which is not limited in the embodiments of the present application. In some network structures, the access network device may include a centralized unit (CU) node and a distributed unit (DU) node, and the centralized unit and the distributed unit may also be geographically separated.

Multi input multi output (MIMO) transmission may be performed between the access network device and the terminal by using one or more antennas respectively, and the MIMO transmission may be single user MIMO (SU-MIMO) or multiple user MIMO (MU-MIMO). According to the form and quantity of the antenna combinations, the MIMO transmission may be 2D-MIMO, 3D-MIMO, FD-MIMO, or massive-MIMO, or may be diversity transmission or precoding transmission or beamforming transmission, etc.

In the communication system, there are many positioning technologies for a terminal. Taking the positioning technology of New Radio (NR) as an example, there are the uplink positioning technology, the downlink positioning technology and the uplink and downlink hybrid positioning technology. The downlink positioning technology includes the downlink time difference of arrival (DL-TDOA) positioning technology and the downlink angle of departure (DL-AoD) positioning technology. The uplink positioning technology includes the uplink time difference of arrival (UL-TDOA) positioning technology and the uplink angle of arrival (UL-AoA) positioning technology in NR. The uplink and downlink hybrid positioning technology includes the multi-cell round trip time (Multi-RTT) positioning technology.

In NR, a corresponding positioning measurement value is defined for each positioning technology, and the positioning of the terminal is realized by reporting the positioning measurement value to the location server.

For example, in the DL-TDOA positioning technology, the terminal reports a downlink reference signal time difference (DL-RSTD). In the DL-AoD positioning technology, the terminal reports a reference signal received power (RSRP) of a positioning reference signal (PRS) for the downlink. In the UL-TDOA positioning technology, the access network device reports a relative time of arrival (RTOA) of the positioning reference signal. In the UL-AoA positioning technology, the access network device reports an azimuth angle of arrival (A-AoA) and a zenith angle of arrival (Z-AOA) of the positioning reference signal. In the Multi-RTT positioning technology, the terminal reports a terminal reception-transmission time difference (UE Rx-Tx time difference), and the access network device reports an access network device reception-transmission time difference (gNB Rx-Tx time difference).

In the DL-AoD positioning technology of NR, each access network device sends multiple PRSs, and each PRS points to different directions after being formed. After receiving the multiple PRSs, the terminal measures RSRPs of multiple PRS resources transmitting the multiple PRSs, and reports the RSRPs of the multiple PRS resources to the location server. The location server determines, by using the RSRPs of the multiple PRS resources of the access network device reported by the terminal in combination with angle information of each PRS resource reported by the access network device, an angle of departure (AoD) from the access network device to the terminal, and further determines location information of the terminal according to AoDs from multiple access network devices to the terminal.

FIG. 1 is a schematic diagram of an application scenario provided by an embodiment of the present application, where the application scenario belongs to a DL-AoD positioning scenario of NR. As shown in FIG. 1, the application scenario includes a location server, multiple access network devices (in FIG. 1, multiple access network devices including a base station 1, a base station 2 and a base station 3 are taken as an example) and a terminal. The location server manages the base station 1, the base station 2 and the base station 3, which send multiple beams, that is, multiple PRSs, respectively. The terminal measures multiple beams in the base station 1, the base station 2 and the base station 3, respectively, and reports measurement results of the measured beams to the location server.

Taking the base station 1 as an example, the multiple PRSs of the base station 1 point to different directions after being formed to form a beam 1, a beam 2 and a beam 3. After measuring the three beams of the base station 1, the terminal sends RSRPs of the beam 1, the beam 2 and the beam 3 to the location server. For example, the terminal sends the RSRPs of the beam 1, the beam 2 and the beam 3 to the location server through a serving base station (not shown in the figure) communicating with itself. The location server determines the AoD from the base station 1 to the terminal in a way of interpolation according to the RSRPs of the beam 1, the beam 2 and the beam 3 and angle information corresponding to the three beams. In this way, the AoD from the base station 2 to the terminal and the AoD from the base station 3 to the terminal may be determined. The location server may determine the location information of the terminal according to the AoDs from the base station 1, the base station 2 and the base station 3 to the terminal respectively.

It can be seen that in the DL-AoD positioning technology, for each access network device, the terminal may report the RSRPs of the multiple PRS resources. Generally, the terminal selects a PRS resource with a larger RSRP for reporting. However, the inventor finds in the research process that the solution of determining the location information of the terminal based on the PRS resource with the larger RSRP does not make full use of a spatial relationship between PRS resources, and the positioning accuracy is low.

In order to solve the above problem, the embodiments of the present application provide a positioning method and apparatus, and a storage medium. In the present application, for each access network device, the terminal determines at least two target PRS resources that are spatially adjacent among multiple PRS resources of the access network device, and sends measurement results of the target PRS resources to the location server, and the location server determines location information of the terminal according to the measurement results of the target PRS resources. Therefore, in the terminal's positioning process of the present application, the terminal reports the measurement results of the PRS resources that are spatially adjacent in the access network device to the location server, and makes full use of main lobe information and side lobe information of the PRS resources of the access network device, that is, makes full use of different characteristics of the PRS resources of the access network device, thus improving the accuracy of performing positioning on the terminal by the location server.

The method and the apparatus provided by the embodiments of the application are based on the same application concept, since the principles for solving the problem according to the method and the apparatus are similar, reference can be made to each other for the implementation of the apparatus and the method, and the repetition is not detailed here.

Figure 2:
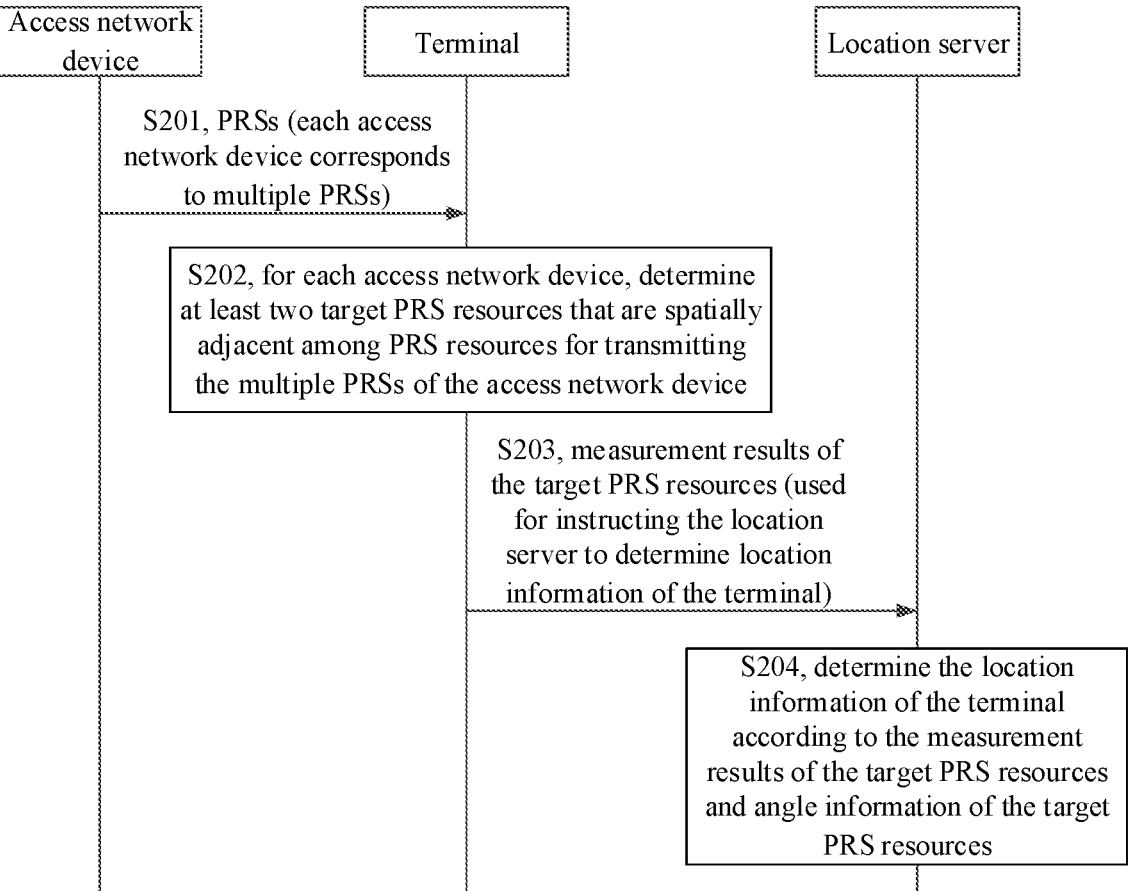
FIG. 2 is a schematic flowchart of a positioning method provided by an embodiment of the present application.

FIG. 2 is a schematic flowchart of a positioning method provided by an embodiment of the present application. As shown in FIG. 2, the method includes:

S201, a terminal receives PRSs from multiple access network devices, where each access network device corresponds to multiple PRSs.

The access network device is a base station or a TRP, and when the access network device is a base station, multiple base stations may include a serving base station of the terminal and multiple non-serving base stations, and the serving base station is a base station that establishes a communication connection with the terminal and provides a communication service for the terminal.

In this step, the access network device corresponds to multiple PRS resources and transmits multiple PRSs to the terminal through the multiple PRS resources. The terminal receives the PRSs sent by the multiple access network devices.

For example, each access network device is configured with M=8 PRS resources, and each PRS resource points to different directions after being formed differently by the access network device. In other words, the direction of each PRS resource in the access network device may be determined by the access network device itself. In the access network device, each PRS resource performs transmission of a PRS (that is, transmission of a beam) according to the direction determined by forming.

S202, for each access network device, the terminal determines at least two target PRS resources that are spatially adjacent among PRS resources for transmitting the multiple PRSs of the access network device.

The PRSs transmitted by the PRS resources that are spatially adjacent are adjacent beams, that is, the PRS resources that are spatially adjacent are PRS resources that point to adjacent directions after being formed.

For a beam, the beam includes a main lobe and a side lobe, the main lobe is a lobe with the best signal quality in the beam, the side lobe is remaining lobes on two sides of the main lobe, and side lobe information of the beam is mainly reflected in other beams adjacent to the beam. If only measurement results of PRS resources with relatively larger RSRPs are reported to the location server, the PRS resources to which the measurement results reported in the positioning process belong are usually PRS resources that are discrete from each other, only main lobe information of the PRS resource is considered, but the side lobe information of the PRS resource is not considered, and a directional diagram (also referred to as a lobe diagram) of the multiple PRSs of the access network device is not fully utilized.

In this step, for each access network device, the terminal determines at least two target PRS resources that are spatially adjacent among the multiple PRS resources of the access network device, and the adjacent characteristics of the side lobe and the main lobe are utilized, which not only considers the main lobe information in the PRS resources of the access network device, but also considers the side lobe information in the PRS resources of the access network device, enriches the measurement results of PRS resources used for the positioning of the terminal, and is beneficial to improving the accuracy of performing positioning on the terminal by the location server.

S203, the terminal sends measurement results of the target PRS resources to a location server, where the measurement result of the target PRS resource is used for instructing the location server to determine location information of the terminal.

The measurement result of the PRS resource includes an RSRP of the PRS resource.

In this step, for each access network device, after determining the target PRS resources, the terminal may measure the target PRS resources to obtain the measurement results of the target PRS resources. In one embodiment, for each access network device, the terminal measures the multiple PRS resources of the access network device, and after obtaining the measurement results of the multiple PRS resources PRS, determines at least two PRS resources that are spatially adjacent among the multiple PRS resources, and obtains measurement results of the target PRS resources from the measurement results of the multiple PRS resources.

In this step, after obtaining the measurement results of the target PRS resources, the terminal sends the measurement results of the target PRS resources to the location server, to instruct the location server to determine the location information of the terminal. Because the location server is located in the core network part, the terminal may send the measurement results of the target PRS resources to a core network device which maintains a communication connection with the terminal, and the core network device forwards the measurement results of the target PRS resources from the terminal to the location server.

S204, the location server determines the location information of the terminal according to the measurement results of the target PRS resources and angle information of the target PRS resources.

The angle information of the target PRS resource includes a horizontal dimension angle of the target PRS resource and/or a vertical dimension angle of the target PRS resource. A horizontal dimension angle of a PRS resource refers to an included angle between a direction pointed by a PRS transmitted by the PRS resource after being formed and the horizontal direction, similarly, a vertical dimension angle of the PRS resource refers to an included angle between a direction pointed by the PRS transmitted by PRS resource after being formed and the vertical direction. For each access network device, the angle information of the multiple PRS resources of the access network device may be sent by the access network device to the location server, or the angle information of the multiple PRS resources of the access network device may be pre-configured in the location server.

In this step, after receiving the measurement results of the target PRS resources, the location server determines, for each access network device, an AoD from the access network device to the terminal according to the measurement results of the target PRS resources belonging to the access network device and the angle information of the target PRS resources belonging to the access network device, to improve the accuracy of the AoD from the access network device to the terminal. According to the AoDs from the multiple access network devices to the terminal, the location server may determine the location information of the terminal, for example, in a way of interpolation. Here, there is no limitation on how to determine the position of the terminal according to the AoDs from the multiple access network devices to the terminal.

In the embodiment of the present application, the terminal receives the PRSs of the multiple access network devices, and for each access network device, the terminal determines at least two target PRS resources that are spatially adjacent among the PRS resources for transmitting the multiple PRSs of the access network device. Therefore, by using the adjacent characteristics of the side lobe and the main lobe, that is, using the azimuth diagram of the PRSs, the main lobe information and the side lobe information in the PRS resources of the access network device are fully considered in the positioning process, which enriches the measurement results of the PRS resources reported by the terminal, and further improves the accuracy of performing positioning on the terminal by the location server according to the measurement results of the PRS resources reported by the terminal.

Figure 3:
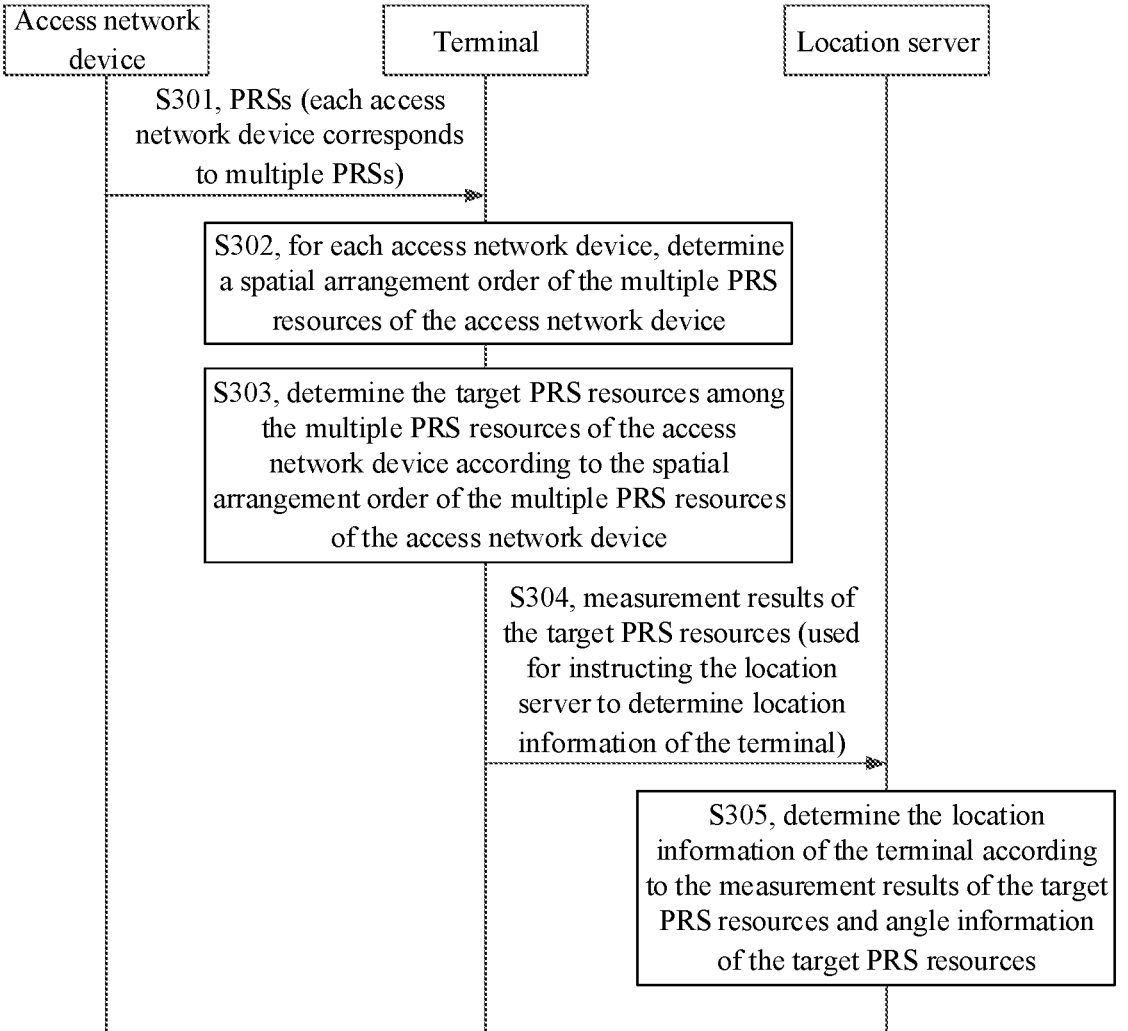
FIG. 3 is a schematic flowchart of a positioning method provided by another embodiment of the present application.

FIG. 3 is a schematic flowchart of a positioning method provided by another embodiment of the present application. As shown in FIG. 3, the method includes:

S301, a terminal receives PRSs from multiple access network devices, where each access network device corresponds to multiple PRSs.

For the implementation principle and effect of S301, reference may be made to the aforementioned embodiment, which will not be repeated.

S302, for each access network device, the terminal determines a spatial arrangement order of the multiple PRS resources of the access network device.

In this step, after receiving the PRSs from the multiple access network devices, the terminal determines, for each access network device, the spatial arrangement order of the PRS resources for transmitting the multiple PRSs in the access network device. For example, one access network device is configured with eight PRS resources: PRS-ID0, PRS-ID1, PRS-ID2, PRS-ID3, PRS-ID4, PRS-ID5, PRS-ID6, PRS-ID7, and the terminal determines that the spatial arrangement order of the eight PRS resources is: PRS-ID2, PRS-ID4, PRS-ID3, PRS-ID1, PRS-ID0, PRS-ID6, PRS-ID7, PRS-ID5.

The spatial arrangement order of the PRS resources of the access network device also represents a spatial arrangement order of multiple PRSs (or multiple beams) after being formed of the access network device.

S303, the terminal determines target PRS resources among the multiple PRS resources of the access network device according to the spatial arrangement order of the multiple PRS resources of the access network device.

In this step, after determining the spatial arrangement order of the multiple PRS resources of each access network device, the terminal may determine, for each access network device, at least two target PRS resources that are spatially adjacent among the multiple PRS resources of the access network device according to the spatial arrangement order of the multiple PRS resources of the access network device. For example, if the spatial arrangement order of eight PRS resources of the access network device is PRS-ID2, PRS-ID4, PRS-ID3, PRS-ID1, PRS-ID0, PRS-ID6, PRS-ID7 and PRS-ID5, it may be determined that PRS-ID2, PRS-ID4 and PRS-ID3 are spatially adjacent target PRS resources, or PRS-ID3, PRS-ID1 and PRS-ID0 are spatially adjacent target PRS resources.

S304, the terminal sends measurement results of the target PRS resources to a location server, where the measurement result of the target PRS resource is used for instructing the location server to determine location information of the terminal.

S305, the location server determines the location information of the terminal according to the measurement results of the target PRS resources and angle information of the target PRS resources.

For the implementation principles and effects of S304 and S305, reference may be made to the aforementioned embodiment, which will not be repeated.

In the embodiment of the present application, the terminal receives the PRSs of the multiple access network devices, and for each access network device, the terminal determines the spatial arrangement order of the multiple PRS resources of the access network device, determines at least two target PRS resources that are spatially adjacent according to the spatial arrangement order of the multiple PRS resources, and sends the measurement results of the target PRS resources to the location server. Therefore, based on the spatial arrangement order of the PRS resources, the accuracy of determining spatially adjacent target PRS resources is improved, and then the accuracy of performing positioning on the terminal by the location server according to the measurement results of the PRS resources reported by the terminal is improved.

In some embodiments, the terminal may receive a fourth message from the location server, the fourth message includes configuration information of the multiple access network devices, and the configuration information of the access network device includes at least one of the following: a spatial arrangement order of the multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource. Therefore, for each access network device, the terminal may determine the spatial arrangement order of the multiple PRS resources in the access network device according to the configuration information of the access network device, In one embodiment, reference can be made to the description of the subsequent corresponding embodiment.

In one embodiment, the fourth message is also used for indicate the number of access network devices and/or identifiers of access network devices for the terminal to perform PRS measurement. For example, if the number of access network devices for which PRS measurement is performed by the terminal indicated in the fourth message is 3, the terminal receives and measures the PRSs of at least 3 access network devices and reports the measurement results of PRS resources of 3 access network devices. For another example, in the fourth message, the identifiers of the access network devices for which PRS measurement is performed by the terminal indicated in the fourth message are TRP0, TRP1 and TRP2, then the terminal measures the PRS resources of the access network devices corresponding to TRP0, TRP1 and TRP2 respectively, and reports the measurement results of the PRS resources of the access network devices corresponding to TRP0, TRP1 and TRP2 respectively.

In one embodiment, the configuration information of the access network device may also be sent to the terminal by the access network device. For example, the access network device sends the configuration information of the access network device to the terminal together with the PRS.

In one embodiment, the configuration information of multiple access network devices is pre-configured in the location server. In one embodiment, before sending the fourth message to the terminal, the location server receives fifth messages from the multiple access network devices, where the fifth message of the access network device includes the configuration information of the access network device, therefore, the access network device sends its own configuration information to the location server, improving the accuracy of the configuration information of the multiple access network devices sent by the location server to the terminal.

Further, the access network device may send the fifth message to the location server after configuring or updating the angle information of the multiple PRS resources. In one embodiment, the access network device may periodically send the fifth message to the location server; or the location server may periodically request configuration information of the access network device from the access network device, and the access network device sends the fifth message to the location server in response to the request of the location server. Therefore, the configuration information of the multiple access network devices in the location server is updated in time, and the accuracy of the configuration information of the multiple access network devices sent by the location server to the terminal is improved.

Figure 4:
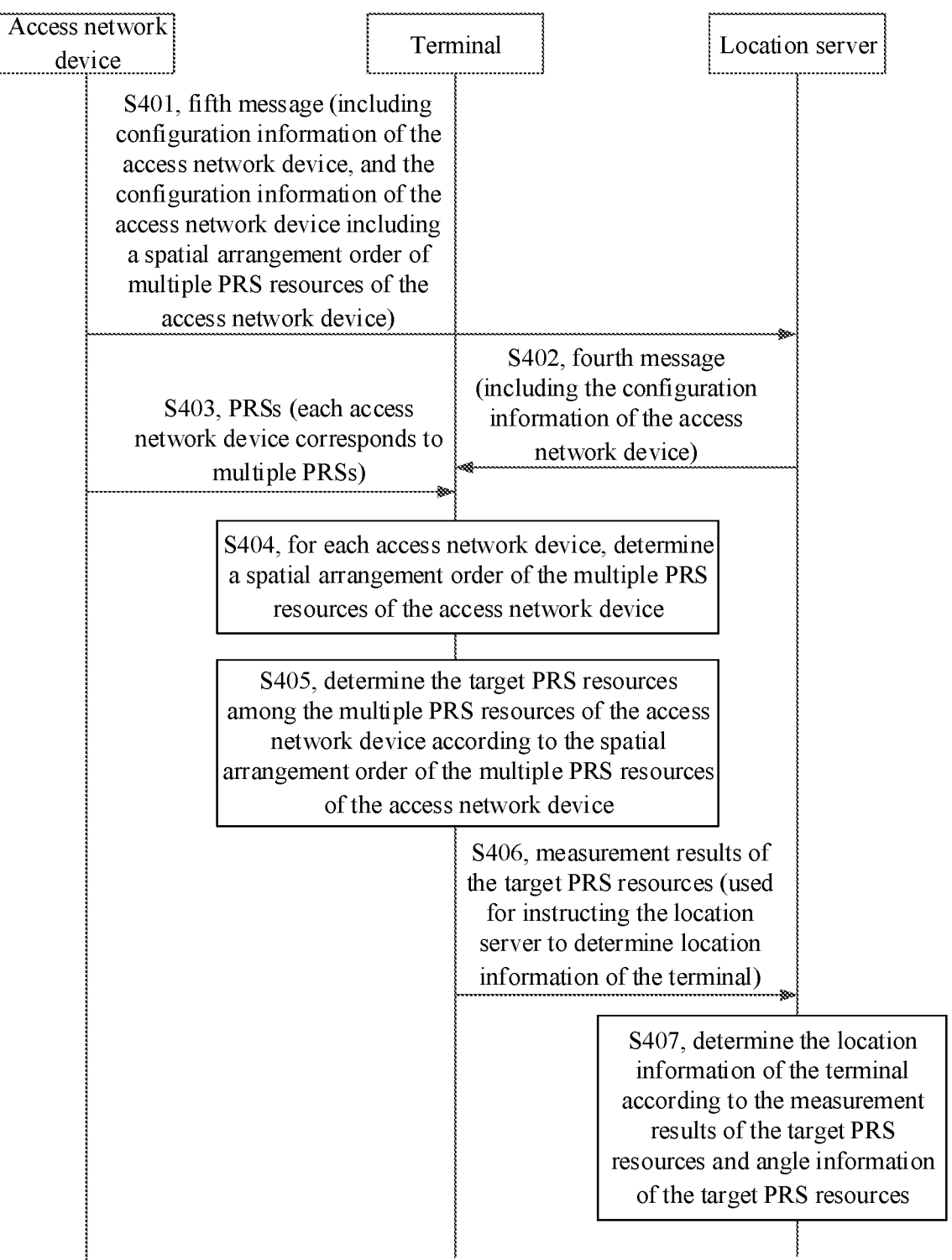
FIG. 4 is a schematic flowchart of a positioning method provided by another embodiment of the present application.

On the basis of the fact that the configuration information of the access network device includes the spatial arrangement order of multiple PRS resources of the access network device, FIG. 4 is a schematic flowchart of a positioning method provided by another embodiment of the present application. As shown in FIG. 4, the method includes:

S401, a location server receives fifth messages from multiple access network devices, where the fifth message includes configuration information of the access network device, and the configuration information of the access network device includes a spatial arrangement order of multiple PRS resources of the access network device;

S402, the location server sends a fourth message to a terminal, and the fourth message includes the configuration information of the multiple access network devices.

In this step, the location server may send the fourth message to the terminal when it detects that the terminal accesses or re-accesses the communication network. For example, when the terminal is turned on, or the terminal switches the serving cell, or the terminal establishes a radio resource control (RRC) connection with an access network device, or the terminal establishes an RRC reconnection with an access network device, the location server sends the fourth message to the terminal, to send the configuration information of the multiple access network devices to the terminal.

S403, the terminal receives PRSs from the multiple access network devices, where each access network device corresponds to multiple PRSs.

S404, for each access network device, the terminal acquires a spatial arrangement order of multiple PRS resources of the access network device from the configuration information of the access network device.

In this step, when the configuration information of the access network device includes the spatial arrangement order of the multiple PRS resources of the access network device, the terminal may directly obtain the spatial arrangement order of the multiple PRS resources of the access network device from the configuration information of the access network device.

S405, the terminal determines target PRS resources among the multiple PRS resources of the access network device according to the spatial arrangement order of the multiple PRS resources of the access network device.

S406, the terminal sends measurement results of the target PRS resources to the location server, where the measurement result of the target PRS resource is used for instructing the location server to determine location information of the terminal.

S407, the location server determines the location information of the terminal according to the measurement results of the target PRS resources and angle information of the target PRS resources.

For the implementation principles and effects of S401, S403, S405, S406 and S407, reference may be made to the aforementioned embodiments, which will not be repeated.

In the embodiment of the present application, the terminal receives the PRSs of the multiple access network devices, and for each access network device, the terminal realizes the determination of at least two target PRS resources that are spatially adjacent based on the spatial arrangement order of the multiple PRS resources of the access network device indicated by the location server, and in the positioning process, the main lobe information and the side lobe information in the PRS resources of the access network device are fully considered, and the accuracy of performing positioning on the terminal by the location server according to the measurement results of the PRS resources reported by the terminal is improved.

Figure 5:
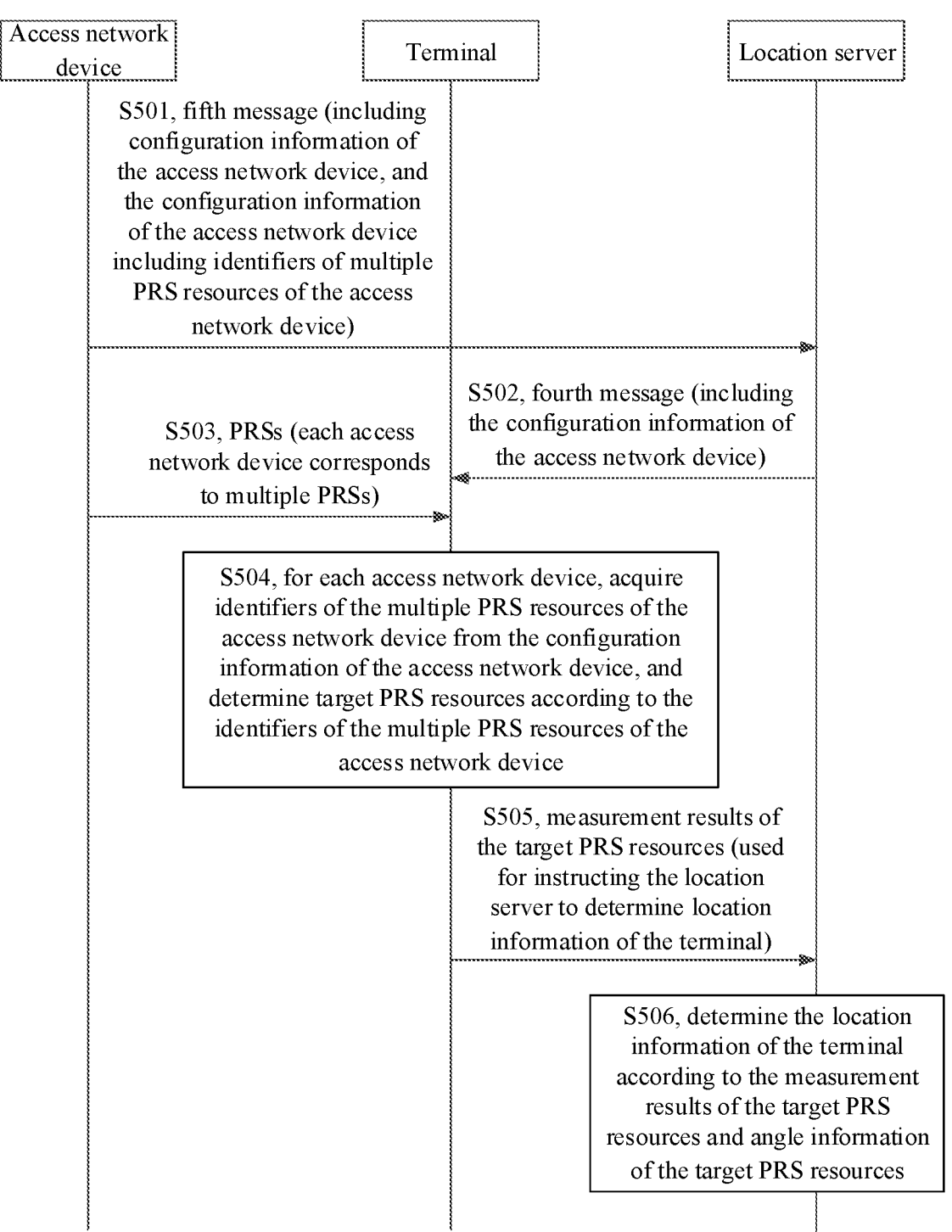

On the basis of the fact that the configuration information of the access network device includes identifiers of multiple PRS resources of the access network device, FIG. 5 is a schematic flowchart of a positioning method provided by another embodiment of the present application. As shown in FIG. 5, the method includes:

S501, a location server receives fifth messages from multiple access network devices, where the fifth message includes configuration information of the access network device, and the configuration information of the access network device includes identifiers of multiple PRS resources of the access network device;

S502, the location server sends a fourth message to a terminal, and the fourth message includes the configuration information of the multiple access network devices;

S503, the terminal receives PRSs from the multiple access network devices, where each access network device corresponds to multiple PRSs.

S504, for each access network device, the terminal acquires identifiers of multiple PRS resources of the access network device from the configuration information of the access network device, and determines target PRS resources according to the identifiers of the multiple PRS resources of the access network device.

The identifiers of the multiple PRS resources of the access network device are associated with the spatial arrangement order of the multiple PRS resources of the access network device.

For each access network device, when numbering the multiple PRS resources of the access network device, the multiple PRS resources of the access network device are numbered according to the spatial arrangement order of the multiple PRS resources of the access network device. Therefore, the identifiers of the multiple PRS resources of the access network device are associated with the spatial arrangement order of the multiple PRS resources of the access network device, which means that an arrangement order of the identifiers of the multiple PRS resources of the access network device is the spatial arrangement order of the multiple PRS resources of the access network device, in other words, two PRS resources with adjacent identifiers satisfy spatial adjacency.

For example, identifiers of multiple PRS resources of an access network device are PRS-ID0, PRS-ID1, PRS-ID2, PRS-ID3 and PRS-ID4 respectively, then the spatial arrangement order of the multiple PRS resources of the access network device is PRS-ID0, PRS-ID1, PRS-ID2, PRS-ID3 and PRS-ID4 in turn.

In this step, when receiving the PRSs from the multiple access network devices, for each access network device, the terminal may obtain the identifiers of PRS resources for transmitting multiple PRS of the access network device from the configuration information of the access network device, and may determine at least two PRS resources with adjacent identifiers based on the identifiers of the multiple PRS resources of the access network device, and determine the at least two PRS resources as target PRS resources. In one embodiment, the spatial arrangement order of the multiple PRS resources of the access network device may be obtained by ordering the identifiers of the multiple PRS resources of the access network device, and the target PRS resources are determined among the multiple PRS resources of the access network device according to the spatial arrangement order of the multiple PRS resources of the access network device.

S505, the terminal sends measurement results of the target PRS resources to the location server, where the measurement result of the target PRS resource is used for instructing the location server to determine location information of the terminal.

S506, the location server determines the location information of the terminal according to the measurement results of the target PRS resources and angle information of the target PRS resources.

For the implementation principles and effects of S501, S502, S503, S505 and S506, reference may be made to the aforementioned embodiments, which will not be repeated.

In the embodiment of the present application, the terminal receives the PRSs of the multiple access network devices, and for each access network device, the terminal realizes the determination of at least two target PRS resources that are spatially adjacent based on the identifiers of the multiple PRS resources of the access network device indicated by the location server, and in the positioning process, the main lobe information and the side lobe information in the PRS resources of the access network device are fully considered, and the accuracy of performing positioning on the terminal by the location server according to the measurement results of the PRS resources reported by the terminal is improved.

Figure 6:
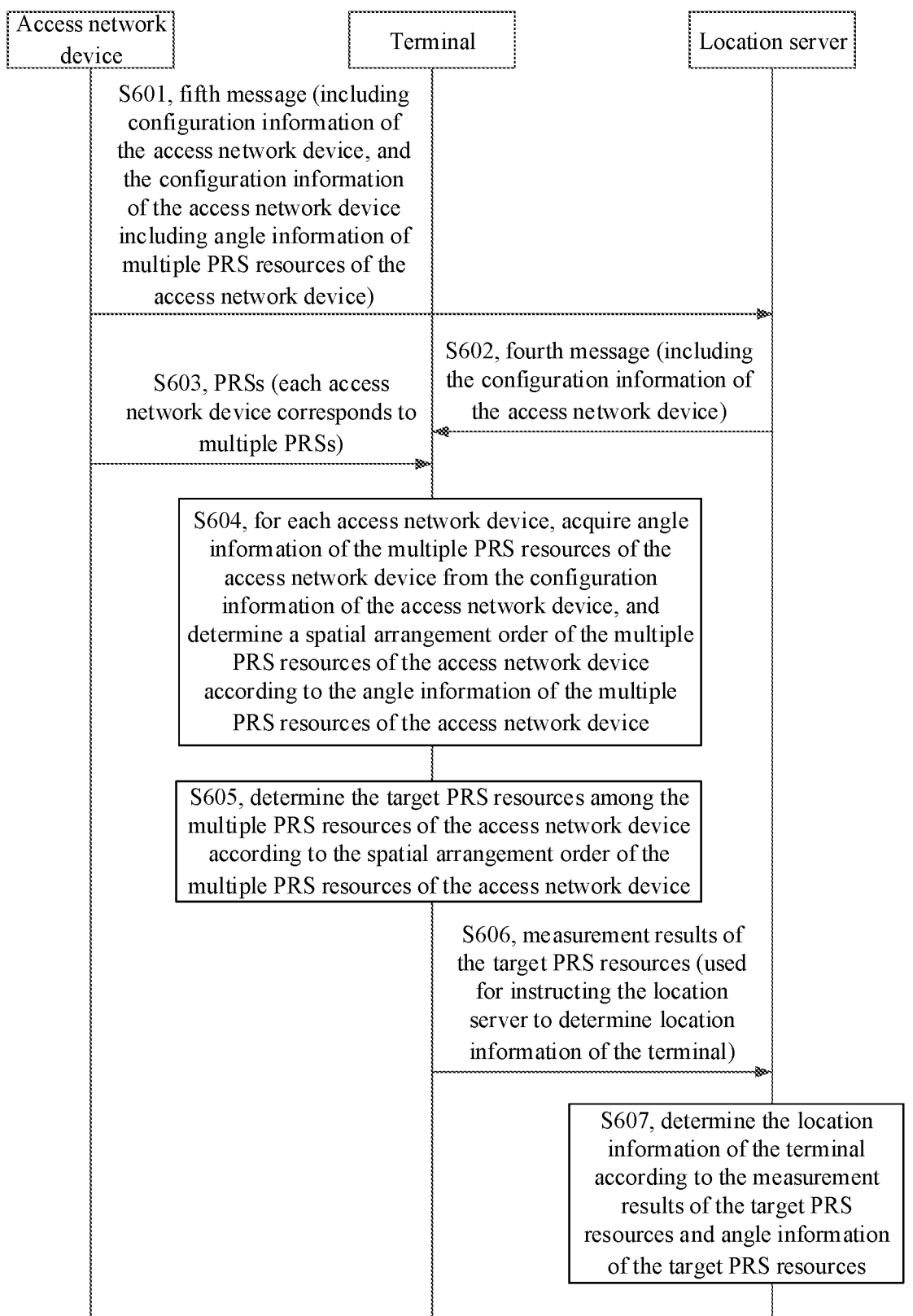
FIG. 6 is a schematic flowchart of a positioning method provided by another embodiment of the present application.

Based on the fact that the configuration information of the access network device includes angle information of multiple PRS resources of the access network device, FIG. 6 is a schematic flowchart of a positioning method provided by another embodiment of the present application. As shown in FIG. 6, the method includes:

> S601, a location server receives fifth messages from multiple access network devices, where the fifth message includes configuration information of the access network device, and the configuration information of the access network device includes angle information of multiple PRS resources of the access network device;
>
> S602, the location server sends a fourth message to a terminal, and the fourth message includes the configuration information of the multiple access network devices;
>
> S603, the terminal receives PRSs from the multiple access network devices, where each access network device corresponds to multiple PRSs;
>
> S604, for each access network device, the terminal acquires angle information of multiple PRS resources of the access network device from the configuration information of the access network device, and determines a spatial arrangement order of the multiple PRS resources of the access network device according to the angle information of the multiple PRS resources of the access network device.

In this step, for each access network device, the terminal acquires the angle information of the multiple PRS resources of the access network device from the configuration information of the access network device, and the angle information of the PRS resource may reflect a position of the PRS resource in space to a given extent. Therefore, according to the angle information of the multiple PRS resources of the access network device, an azimuth relationship among the PRS resources of the access network device is determined, and then the spatial arrangement order of the multiple PRS resources of the access network device is determined.

When the angle information of the PRS resource is the horizontal dimension angle of the PRS resource, the multiple PRS resources of the access network device may be sorted according to an order of angle sizes of the horizontal dimension angles of the multiple PRS resources of the access network device. For example, the access network device is configured with a total of 8 PRS resources: PRS-ID0, PRS-ID1, PRS-ID2, PRS-ID3, PRS-ID4, PRS-ID5, PRS-ID6 and PRS-ID7, and the horizontal dimension angles of these 8 PRS resources are 10 degrees, 20 degrees, 30 degrees, 40 degrees, 50 degrees, 60 degrees, 70 degrees and 80 degrees respectively, then the spatial arrangement order of these 8 PRS resources is PRS-ID0, PRS-ID1, PRS-ID2, PRS-ID3, PRS-ID4, PRS-ID5, PRS-ID6, PRS-ID7. Similarly, when the angle information of the PRS resource is the vertical dimension angle of the PRS resource, the multiple PRS resources of the access network device may be sorted according to an order of angle sizes of the vertical dimension angles of the multiple PRS resources of the access network device.

When the angle information of the PRS resource includes the horizontal dimension angle and the vertical dimension angle information of the PRS resource, the horizontal dimension angle and the vertical dimension angle information of the PRS resource may indicate the position of the PRS resource in space, and the spatial arrangement order of multiple PRS resources may be determined more accurately according to the horizontal dimension angle and the vertical dimension angle information of the multiple PRS resources.

> S605, the terminal determines target PRS resources among the multiple PRS resources of the access network device according to the spatial arrangement order of the multiple PRS resources of the access network device.
>
> S606, the terminal sends measurement results of the target PRS resources to the location server, where the measurement result of the target PRS resource is used for instructing the location server to determine location information of the terminal.
>
> S607, the location server determines the location information of the terminal according to the measurement results of the target PRS resources and angle information of the target PRS resources.

For the implementation principles and effects of S601, S602, S603, S605, S606 and S607, reference may be made to the aforementioned embodiments, which will not be repeated.

In the embodiment of the present application, the terminal receives the PRSs of the multiple access network devices, and for each access network device, the terminal determines the spatial arrangement order of the multiple PRS resources of the access network device based on the angle information of the multiple PRS resources of the access network device indicated by the location server, to improve the accuracy of determining at least two target PRS resources that are spatially adjacent, and further improving the accuracy of performing positioning on the terminal by the location server according to the measurement results of the PRS resources reported by the terminal.

Figure 7:
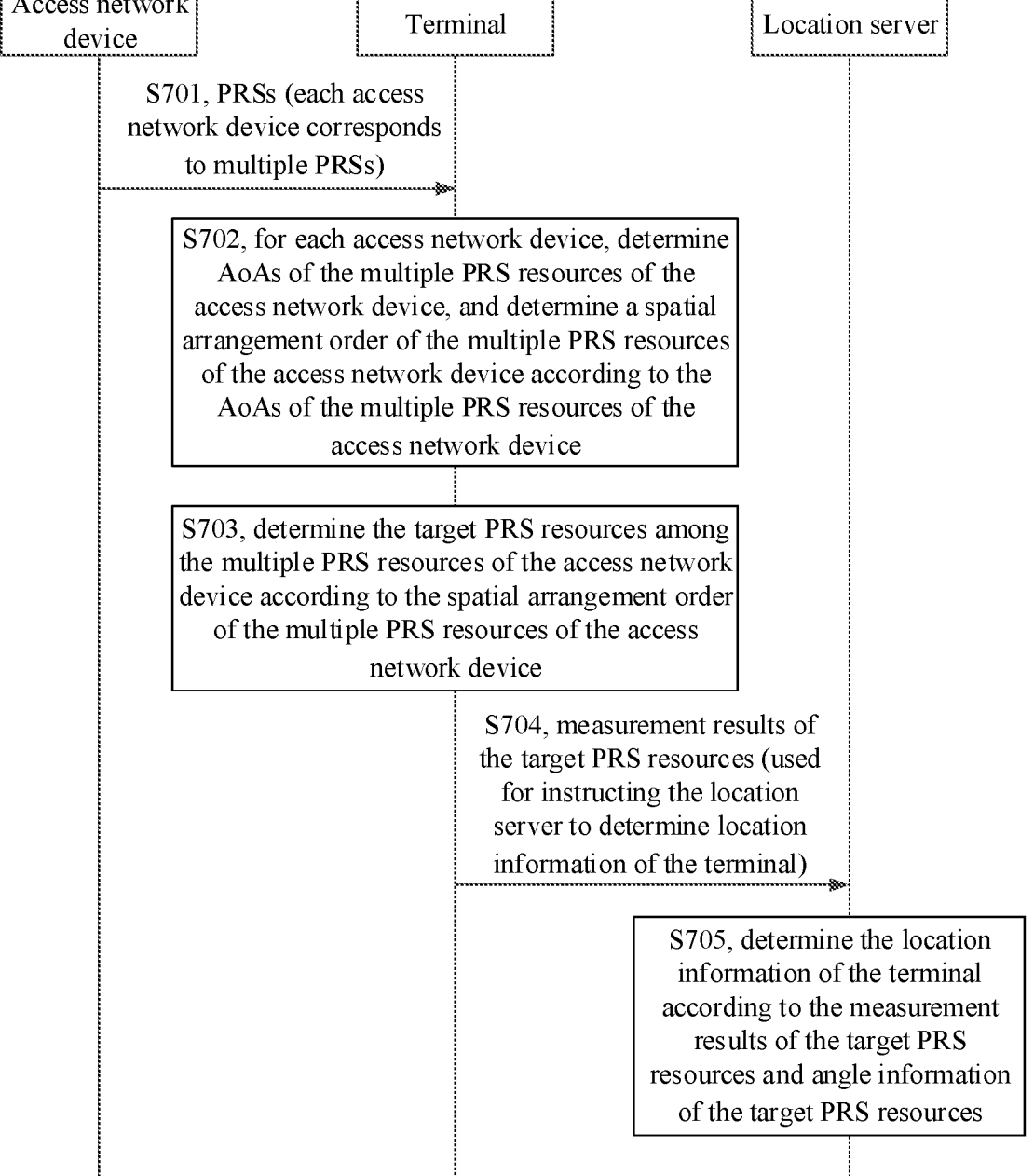
FIG. 7 is a schematic flowchart of a positioning method provided by another embodiment of the present application.

In addition to the above-mentioned method of determining the spatial arrangement order of the multiple PRS resources of the access network device, when the terminal has the ability to measure an AoA of the PRS resource of the access network device, the terminal may also determine the spatial arrangement order of the multiple PRS resources of the access network device according to AoAs of the PRS resources. Based on this, FIG. 7 provides a schematic flowchart of a positioning method provided by another embodiment of the present application. As shown in FIG. 7, the method includes:

> S701, a terminal receives PRSs from multiple access network devices, where each access network device corresponds to multiple PRSs.

In one embodiment, before S701, the terminal may also receive a fourth message from a location server, the fourth message includes configuration information of the multiple access network devices, and/or identifiers of access network devices for which the location server instructs the terminal to perform PRS resource measurement and reporting, and/or the number of access network devices for which the location server instructs the terminal to perform PRS measurement. For the configuration information of the access network device, reference may be made to the aforementioned embodiments, which will not be repeated.

> S702, for each access network device, the terminal determines AoAs of the multiple PRS resources of the access network device, and determines a spatial arrangement order of the multiple PRS resources of the access network device according to the AoAs of the multiple PRS resources of the access network device.

The AoA of the PRS resource includes a horizontal dimension AoA and/or a vertical dimension AoA of the PRS resource. The horizontal dimension AoA of the PRS resource refers to an included angle between an arrival angle of a PRS signal transmitted by the PRS resource at the terminal and the horizontal direction, and the vertical dimension AoA of the PRS resource refers to an included angle between the arrival angle of the PRS signal transmitted by the PRS resource at the terminal and the vertical direction.

In this step, for each access network device, the terminal measures the AoAs of the multiple PRS resources of the access network device, and sorts the multiple PRS resources of the access network device according to a size order of the AoAs of the multiple PRS resources of the access network device, and the sorting result obtained is the spatial arrangement order of the multiple PRS resources of the access network device.

For example, the access network device is configured with a total of 8 PRS resources: PRS-ID0, PRS-ID1, PRS-ID2, PRS-ID3, PRS-ID4, PRS-ID5, PRS-ID6 and PRS-ID7, and AoAs of these 8 PRS resources measured by the terminal are respectively 20 degrees, 80 degrees, 10 degrees, 40 degrees, 50 degrees, 30 degrees, 90 degrees and 60 degrees, then the spatial arrangement order of these 8 PRS resources is PRS-ID2, PRS-ID0, PRS-ID5, PRS-ID3, PRS-ID4, PRS-ID7, PRS-ID1, PRS-ID6.

S703, the terminal determines target PRS resources among the multiple PRS resources of the access network device according to the spatial arrangement order of the multiple PRS resources of the access network device.

S704, the terminal sends measurement results of the target PRS resources to the location server, where the measurement result of the target PRS resource is used for instructing the location server to determine location information of the terminal.

S705, the location server determines the location information of the terminal according to the measurement results of the target PRS resources and angle information of the target PRS resources.

For the implementation principles and effects of S701, S703, S704 and S705, reference may be made to the aforementioned embodiments, which will not be repeated.

In the embodiment of the present application, the terminal receives the PRSs of the multiple access network devices, and for each access network device, the terminal determines the spatial arrangement order of the multiple PRS resources of the access network device based on the AOAs of the multiple PRS resources of the access network device indicated by the location server, to improve the accuracy of determining at least two target PRS resources that are spatially adjacent, and further improving the accuracy of performing positioning on the terminal by the location server according to the measurement results of the PRS resources reported by the terminal.

In some embodiments, the terminal has the ability to measure the AoA of the PRS resource of the access network device, in addition to measuring to obtain the RSRP of the PRS resource of the access network device, the terminal may also measure to obtain whether a transmission channel corresponding to the RSRP of the PRS resource belongs to a line of sight (LOS) path. When there is no occlusion between the access network device and the terminal, the transmission channel between the access network device and the terminal is the LOS path. At this time, the measurement result of the target PRS resource sent by the terminal to the location server includes the RSRP of the target PRS resource and whether the transmission channel corresponding to the RSRP is the LOS path, to improve the richness of the measurement result of the PRS resource reported to the location server and improve the accuracy of performing positioning on the terminal by the location server.

Further, when the terminal has the ability to measure the AoA of the PRS resource of the access network device, the terminal may send a second message to the location server, and the second message is used for indicating that the terminal supports measurement of the AoA of the PRS resource. After receiving the second message, the location server may send the spatial arrangement order of the multiple PRS resources of the access network device to the terminal, to assist the terminal to more accurately determine whether a transmission channel corresponding to the RSRP of each PRS resource is a LOS path.

Based on any of the aforementioned embodiments, one possible implementation manner for the terminal to determine the target PRS resources among the multiple PRS resources of the access network device according to the spatial arrangement order of the multiple PRS resources of the access network device includes: determining first PRS resource(s) among the multiple PRS resources of the access network device; determining one or more second PRS resources for the first PRS resource(s); and determining that the target PRS resources are the first PRS resource(s) and the second PRS resource(s).

In this implementation manner, the first PRS resource may be determined according to the quality of the PRS transmitted by the PRS resource, and one or more second PRS resources that are spatially adjacent can be determined on both sides of the first PRS resource according to the spatial arrangement order of the multiple PRS resources of the access network device. In one embodiment, the first PRS resource may be determined according to the identifiers of the multiple PRS resources of the access network device, and one or more second PRS resources are determined for the first PRS resource. For example, the location server may indicate the identifiers of the first PRS resource and the second PRS resource to the terminal, and the terminal determines the first PRS resource and the second PRS resource according to the identifiers of the first PRS resource and the second PRS resource indicated by the location server.

In an example, a PRS resource with the best quality of PRS transmitted may be determined as the first PRS resource among the multiple PRS resources of the access network device, for example, a PRS resource with the maximum RSRP is determined as the first PRS resource among the multiple PRS resources of the access network device. One or more PRS resources that are spatially adjacent and located on two sides of the first PRS resource in the spatial arrangement order of the multiple PRS resources of the access network device, are determined as the second PRS resource(s). Both the first PRS resource and the second PRS resource(s) are determined as the target PRS resources.

Further, after the first PRS resource and the second PRS resource are determined according to the above operations, it may also continue to determine, among the multiple PRS resources of the access network device, a PRS resource whose quality of PRS transmitted ranks second in an order from good to poor as the first PRS resource, for example, determine a PRS resource which ranks second in the order of RSRP from large to small as the first PRS resource, and then determine one or more second PRS resources according to the first PRS resource.

For example, the spatial arrangement order of the 8 PRS resources of the access network device is PRS-ID5, PRS-ID7, PRS-ID3, PRS-ID2, PRS-ID0, PRS-ID1, PRS-ID6 and PRS-ID4, assuming that a PRS resource with the largest RSRP among the 8 PRS resources is a PRS resource corresponding to PRS-ID3, then the PRS resource corresponding to PRS-ID3 is the first PRS resource. One or more second PRS resources are determined on both sides of PRS-ID3, for example, one PRS resource is determined on both sides of PRS-ID3 respectively, and the obtained target PRS resources include PRS resources corresponding to PRS-ID7, PRS-ID3 and PRS-ID2 respectively; for another example, two PRS resources are determined on both sides of PRS-ID3 respectively, and the obtained target PRS resources include PRS resources corresponding to PRS-ID5, PRS-ID7, PRS-ID3, PRS-ID2 and PRS-ID0 respectively. After this round, among the 8 PRS resources, a PRS resource which ranks second in the order of RSRP from large to small may be determined as the first PRS resource, the above operation is repeated to obtain the next round of target PRS resources. In this way, multiple rounds of determination of target PRS resources may be performed. If there are duplicates in multiple rounds of target PRS resources, the terminal simply needs to report the measurement results of the repeated PRS resources to the location server once, without repeated reporting.

In one embodiment, the location server may send a third message to the terminal, and the third message is used for indicating the reported number of the first PRS resource and/or the reported number of the second PRS resource. For example, if the third message indicates that the reported number of the first PRS resource is 1, it is sufficient to determine the target PRS resource for one round. For another example, if the third message indicates that the reported number of the second PRS resources is 2, two second PRS resources are determined on both sides of the first PRS resource respectively, in the process of determining the target PRS resources in each round.

In one embodiment, the location server may also indicate the reported number of the first PRS resource and/or the reported number of the second PRS resource in the fourth message sent to the terminal.

In some embodiments, before the terminal reports the measurement results of the target PRS resources to the location server, the location server may further send a first message to the terminal, where the first message is used for indicating a preset condition that PRS resources whose measurement results are to be reported should meet. After receiving the first message, the terminal may determine the target PRS resources according to the first message, and report the target PRS resources meeting the preset condition in the first message to the location server. Therefore, by reporting the PRS resources that meet the requirement specified by the location server, the accuracy of performing positioning on the terminal by the location server is improved.

In an example, the preset condition in the first message is identifiers of the PRS resources whose measurement results are to be reported. At this time, determining the target PRS resources by the terminal according to the first message includes: determining PRS resources corresponding to the identifiers of the PRS resources whose measurement results are to be reported among the multiple PRS resources of the access network device as the target PRS resources. For example, in the preset condition in the first message, identifiers of PRS resources of the access network device TRP0 whose measurement results are to be reported include PRS-ID3, PRS-ID2 and PRS-ID0, then the terminal may determine that the target resources are PRS resources whose identifiers are PRS-ID3, PRS-ID2 and PRS-ID0 among the multiple PRS resources of the access network device, and send the measurement results of the screened target PRS resources to the location server.

In one embodiment, the PRS resources whose measurement results are to be reported are adjacent PRS resources, and the target PRS resources determined by the terminal based on the first message are still spatially adjacent PRS resources. For example, the location server may send the identifiers of PRS resources that are spatially adjacent to the terminal through the first message.

In another example, the preset condition in the first message is that attribute values of the PRS resources whose measurement results are to be reported meet a preset threshold. At this time, determining the target PRS resources by the terminal according to the first message includes: determining the target PRS resources according to the spatial arrangement order of the multiple PRS resources among the multiple PRS resources of the access network device; and screening, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, after determining the target PRS resources based on the spatial arrangement order of the multiple PRS resources, the terminal compares the attribute values of the target PRS resources with the preset threshold, and sends the measurement result of the target PRS resource whose attribute value meets the preset threshold to the location server. For example, a measurement result of a target PRS resource with a signal-to-interference-plus-noise ratio greater than a first threshold, and/or a signal-to-noise ratio greater than a second threshold, and/or an RSRP greater than a third threshold is sent to the location server. Therefore, the location server instructs the terminal to report the measurement results of PRS resources with better transmission signal qualities through the first message, which improves the accuracy of performing positioning on the terminal by the location server. For the implementation principle and effect of determining the target PRS resources based on the spatial arrangement order of the multiple PRS resources, reference may be made to the aforementioned embodiments, which will not be repeated.

In another example, the preset condition in the first message is that PRS resources whose measurement results are to be reported are not limited by spatial adjacency, or the PRS resources whose measurement results are to be reported are limited by spatial adjacency. When the PRS resources whose measurement results are to be reported are not limited by spatial adjacency, the terminal may directly send the measurement results of the target PRS resources to the location server, or screen the target PRS resources according to the qualities of the PRSs transmitted by the target PRS resources, and send the measurement results of the screened target PRS resources to the location server. When the PRS resources whose measurement results are to be reported are limited by spatial adjacency, the terminal may send the measurement results of the target PRSs to the location server directly.

Further, after the location server sends the fourth message to the terminal, where the fourth message includes spatial arrangement orders of the multiple PRS resources of the multiple access network devices, or the fourth message includes identifiers of the multiple PRS resources of the multiple access network devices, and the identifiers of the multiple PRS resources of the access network device are related to the spatial arrangement order of the multiple PRS resources of the access network device, or the fourth message includes angle information of the multiple PRS resources of the multiple access network devices. In one embodiment, after the location server receives the second message sent by the terminal, where the second message is used for indicating that the terminal supports measurement of an AoA of a PRS resource. The location server may send the first message to the terminal, and the preset condition in the first message is that the PRS resources whose measurement results are to be reported are not limited by spatial adjacency. Therefore, under the condition that the terminal can perform the determination of the spatial arrangement order of the multiple PRS resources of the access network device, the location server indicates to the terminal that the PRS resource whose measurement result is to be reported is not limited by spatial adjacency.

Further, the first message may also be used for indicating to the terminal the reported number of spatially adjacent PRS resources, for example, the reported number of target PRS resources, and/or the reported number of first PRS resources, and/or the reported number of second PRS resources. At this time, the first message and the third message may be the same message or different messages.

Figure 8:
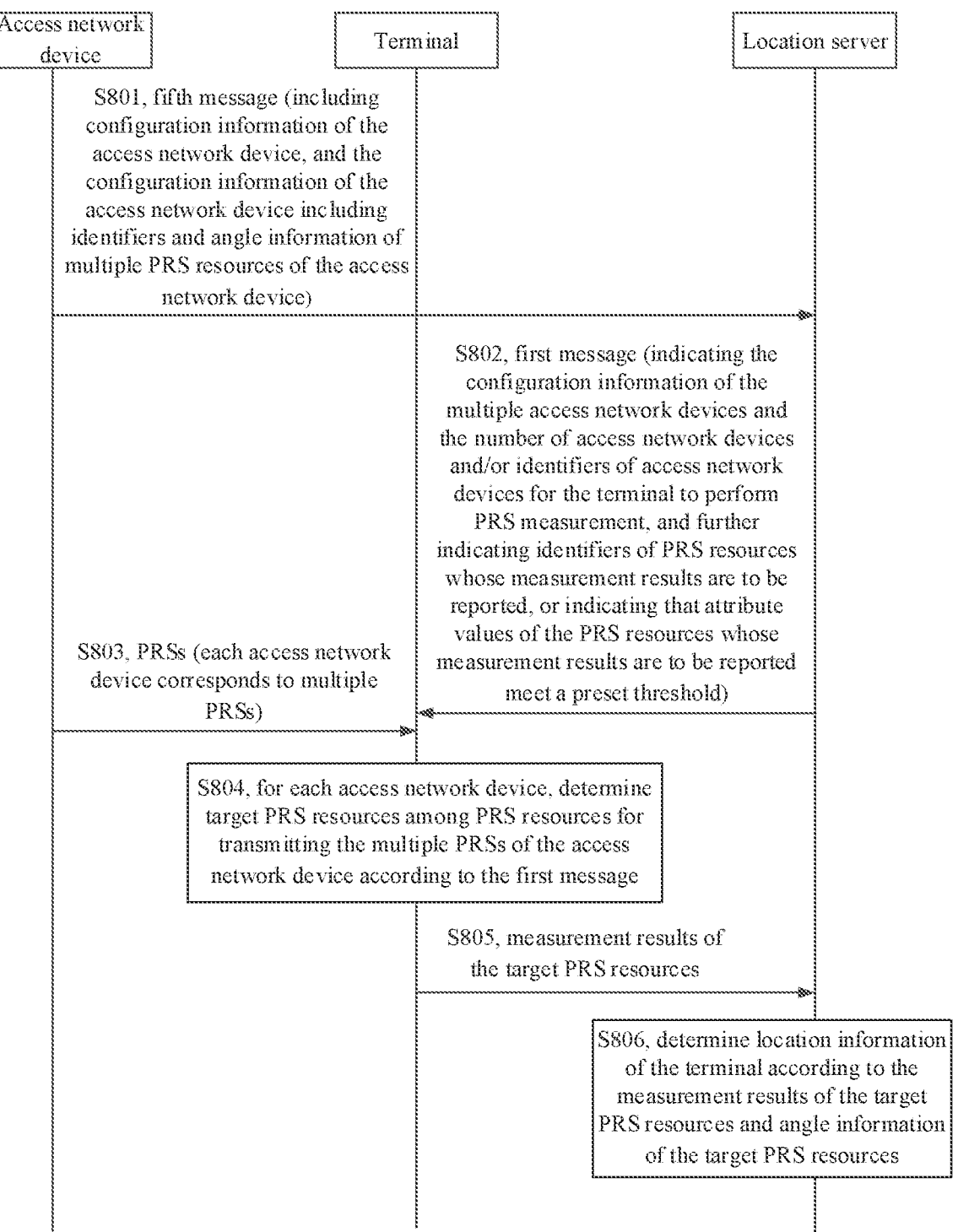
FIG. 8 is a schematic flowchart of a positioning method provided by another embodiment of the present application.

FIG. 8 is a schematic flowchart of a positioning method provided by another embodiment of the present application. As shown in FIG. 8, the method includes:

S801, a location server receives fifth messages from multiple access network devices, where the fifth message includes configuration information of the access network device, and the configuration information of the access network device includes identifiers and angle information of multiple PRS resources of the access network device.

In one embodiment, in DL-AoD positioning, each access network device is configured with multiple PRS resources, and for each access network device, different PRS resources of the access network device point to different directions after being formed, where the direction of the PRS resource is represented by the angle information of the PRS resource, the angle information of the PRS resource includes a horizontal dimension angle and/or a vertical dimension angle of the PRS resource, and the values of these angles are determined by the access network device. For the horizontal dimension angle and the vertical dimension angle of the PRS resource, reference may be made to the description of the aforementioned embodiments, which will not be repeated here.

In one embodiment, the location server receives fifth messages from the multiple access network devices, and for each access network device, the fifth message of the access network device includes configuration information of the access network device, that is, identifiers and angle information of multiple PRS resources of the access network device. The identifiers of different PRS resources in the same access network device are different, and the identifiers of PRS resources are, for example, numbers of PRS resources.

For example, the access network device TRP0 is configured with 8 PRS resources, and identifiers of these 8 PRS resources may be expressed as PRS-ID0, PRS-ID1, PRS-ID2, PRS-ID3, PRS-ID4, PRS-ID5, PRS-ID6 and PRS-ID7 respectively.

S802, the location server sends a first message to a terminal, where the first message is used for indicating the configuration information of the multiple access network devices and the number of access network devices and/or identifiers of access network devices for the terminal to perform PRS measurement, and the first message is also used for indicating identifiers of PRS resources whose measurement results are to be reported, or indicating that attribute values of the PRS resources whose measurement results are to be reported meet a preset threshold.

In one embodiment, the location server may indicate to the terminal, according to its own needs, for example, according to the requirements of positioning services, or when the terminal accesses the communication network, the configuration information of the multiple access network devices, the number and/or identifiers of access network devices for the terminal to perform PRS measurement; and indicate to the terminal the identifiers of the PRS resources whose measurement results are to be reported or indicate that the attribute values of the PRS resources whose measurement results are to be reported meet the preset threshold. For the configuration information of the access network device, reference may be made to the description of S801.

In one embodiment, the location server indicates to the terminal that the attribute values of the PRS resources whose measurement results are to be reported meet the preset threshold, which means that the location server indicates the measurement results of the PRS resources whose attribute values meet the preset threshold. At this time, the location server instructs the terminal to report the measurement result of a PRS resource with better transmission signal quality, to improve the accuracy of performing positioning on the terminal by the location server. The attribute value of the PRS resource includes at least one of the following: a signal-to-interference-plus-noise ratio of the PRS resource, a signal-to-noise ratio of the PRS resource, or an RSRP of the PRS resource.

In one embodiment, the location server indicates to the terminal the identifiers of the PRS resources whose measurement results are to be reported, which means that the location server instructs the terminal to report measurement results of specific PRS resources. At this time, the location server instructs the terminal to report the measurement results of the specific PRS resources, saving power consumption of the terminal.

For example, the location server instructs the terminal to measure and report PRS resources of 3 access network devices, and indicates that identifiers of PRS resources whose measurement results are to be reported are: PRS-ID1, PRS-ID2 and PRS-ID3 in the access network device TRP0; PRS-ID4, PRS-ID5, PRS-ID6 and PRS-ID7 in the access network device TRP1; PRS-ID0, PRS-ID2, PRS-ID4 and PRS-ID6 in the access network device TRP2, respectively.

In one embodiment, the location server may indicate to the terminal, through multiple messages, the configuration information of the multiple access network devices, the number and/or identifiers of the access network devices for the terminal to perform PRS measurement, and the identifiers of the PRS resources whose measurement results are to be reported, or indicate that the attribute values of the PRS resources whose measurement results are to be reported meet the preset threshold. For example, the location server indicates the identifiers of the PRS resources whose measurement results are to be reported or indicates that the attribute values of the PRS resources whose measurement results are to be reported meet the preset threshold through the first message; the location server indicates the configuration information of the multiple access network devices, the number and/or identifiers of the access network devices for the terminal to perform PRS measurement through the fourth message. The location server may send the first message and the fourth message to the terminal at the same time, or may not send them at the same time.

S803, the terminal receives PRSs from the multiple access network devices, where each access network device corresponds to multiple PRSs.

S804, for each access network device, the terminal determines target PRS resources among PRS resources for transmitting the multiple PRSs of the access network device according to the first message.

In one embodiment, when the location server indicates that the attribute values of the PRS resources whose measurement results are to be reported meet the preset threshold, for each access network device, the terminal measures attribute values of the multiple PRS resources of the access network device, and determines PRS resources whose attribute values meet the preset threshold as the target PRS resources. For example, among the multiple PRS resources of the access network device, PRS resources with a signal-to-interference-plus-noise ratio greater than −10 dB are determined as the target PRS resources.

In one embodiment, when the location server indicates the identifiers of the PRS resources whose measurement results are to be reported, the terminal determines, among multiple PRS resources of each access network device, PRS resources corresponding to the identifiers of the PRS resources whose measurement results are to be reported as the target PRS resources. For example, if the identifiers of the PRS resources whose measurement results are to be reported are: PRS-ID1, PRS-ID2 and PRS-ID3 in the access network device TRP0, PRS-ID4, PRS-ID5, PRS-ID6 and PRS-ID7 in the access network device TRP1, and PRS-ID0, PRS-ID2, PRS-ID4 and PRS-ID6 in the access network device TRP2 respectively, then the terminal determines PRS resources respectively corresponding to PRS-ID1, PRS-ID2 and PRS-ID3 in the access network device TRP0, PRS resources respectively corresponding to PRS-ID4, PRS-ID5, PRS-ID6 and PRS-ID7 in the access network device TRP1, and PRS resources respectively corresponding to PRS-ID0, PRS-ID2, PRS-ID4 and PRS-ID6 in the access network device TRP2 as the target PRS resources respectively.

S805, the terminal sends measurement results of the target PRS resources to the location server.

In one embodiment, the terminal sends the measurement results of the target PRS resources and the identifiers of the target PRS resources to the location server to instruct the location server to determine the location information of the terminal.

The measurement result of the target PRS resource includes the RSRP of the target PRS resource.

S806, the location server determines location information of the terminal according to the measurement results of the target PRS resources and the angle information of the target PRS resources.

In one embodiment, for each access network device, the location server determines an AoD from the access network device to the terminal according to the received measurement results of the target PRS resources of the access network device and the angle information of the target PRS resources, and the location server may determine, according to AoDs from multiple access network devices to the terminal, the location information of the terminal for example, in a way of interpolation.

In the embodiment of the present application, the terminal receives the PRS from the multiple access network devices, and for each access network device, the terminal reports, among PRS resources for transmitting multiple PRS of the access network device, the measurement results of the PRS resources whose attribute values meet the preset threshold to the location server according to the indication of the location server, or reports the measurement results of the PRS resources specified by the location server, thus improving the flexibility of reporting the measurement results of the PRS resources by the terminal, and further improving the positioning effect.

Figure 9:
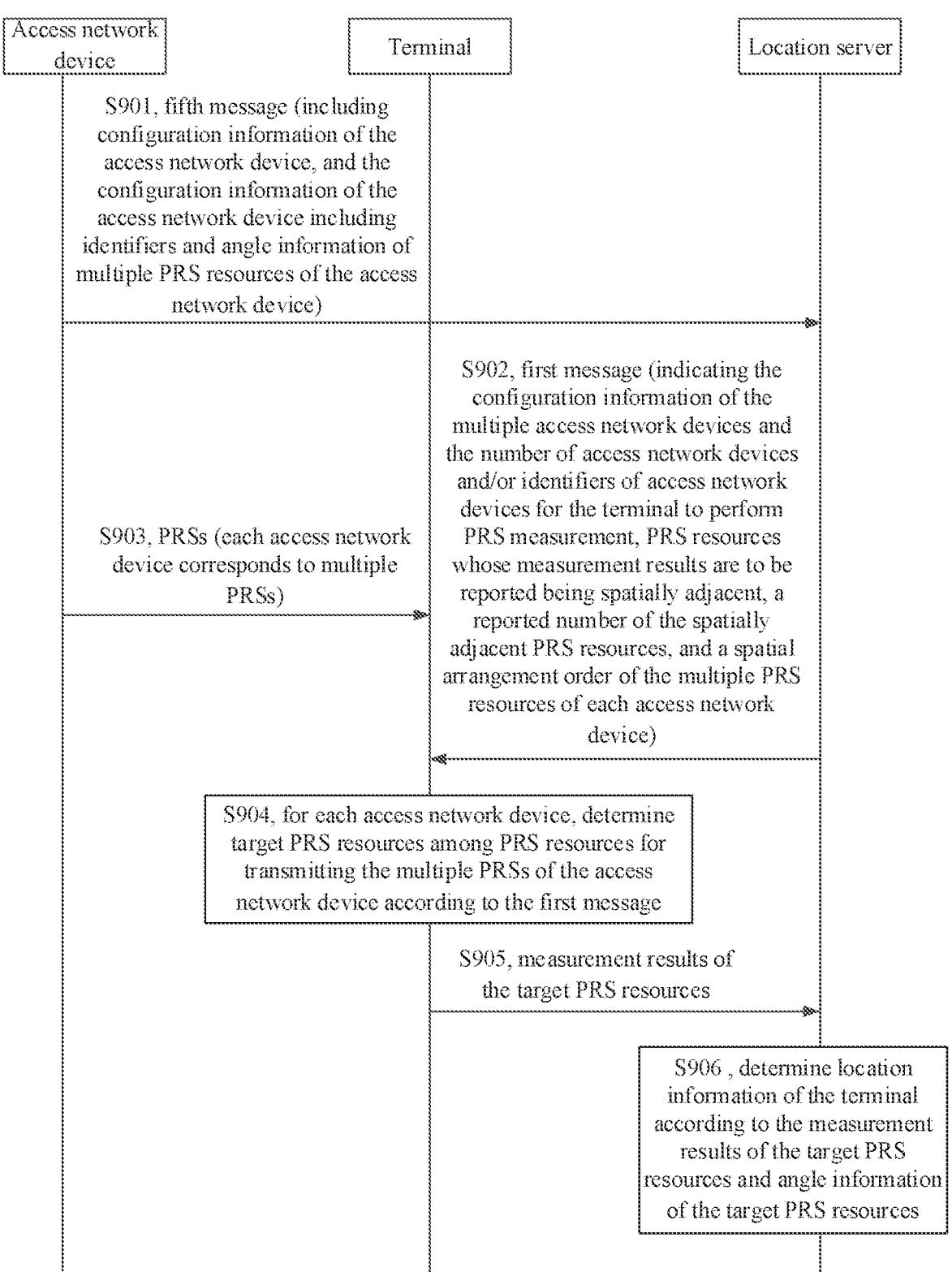
FIG. 9 is a schematic flowchart of a positioning method provided by another embodiment of the present application.

FIG. 9 is a schematic flowchart of a positioning method provided by another embodiment of the present application. As shown in FIG. 9, the method includes: S901, a location server receives fifth messages from multiple access network devices, where the fifth message includes configuration information of the access network device, and the configuration information of the access network device includes identifiers and angle information of multiple PRS resources of the access network device.

For the implementation principle and effect of S901, reference may be made to the aforementioned embodiment, which will not be repeated.

S902, the location server sends a first message to a terminal, where the first message is used for indicating the configuration information of the multiple access network devices and the number and/or identifiers of access network devices for the terminal to perform PRS measurement, and the first message is also used for indicating PRS resources whose measurement results are to be reported being spatially adjacent, a reported number of the spatially adjacent PRS resources, and a spatial arrangement order of the multiple PRS resources of each access network device.

The reported number of the spatially adjacent PRS resources may refer to a reported number of adjacent PRS resources (i.e. the second PRS resources in the aforementioned embodiments) determined respectively on both sides of the main PRS resource (i.e. the first PRS resource in the aforementioned embodiments). For example, if the reported number of spatially adjacent PRS resources is N, the terminal reports the measurement results of 2N+1 PRS resources for one main PRS resource.

In one embodiment, for each access network device, the location server may determine the spatial arrangement order of the multiple PRS resources of the access network device according to the horizontal dimension angles and/or the vertical dimension angles of the multiple PRS resources of the access network device. Reference may be made to the aforementioned embodiments for the specific process, which will not be repeated.

In one embodiment, the location server may indicate to the terminal, through multiple messages, the configuration information of the multiple access network devices, the number and/or identifiers of the access network devices for the terminal to perform PRS measurement, and the PRS resources whose measurement results are to be reported being spatially adjacent, the reported number of the spatially adjacent PRS resources, and the spatial arrangement order of the multiple PRS resources of each access network device.

For example, the first message indicates the PRS resources whose measurement results are to be reported being spatially adjacent, the reported number of the spatially adjacent PRS resources, and the spatial arrangement order of the multiple PRS resources of each access network device. The fourth message indicates the configuration information of the multiple access network devices, the number and/or identifiers of the access network devices for the terminal to perform PRS measurement. The location server may send the first message and the fourth message to the terminal at the same time, or may not send them at the same time.

S903, the terminal receives PRSs from the multiple access network devices, where each access network device corresponds to multiple PRSs.

S904, for each access network device, the terminal determines target PRS resources among PRS resources for transmitting the multiple PRSs of the access network device according to the first message.

In one embodiment, according to the configuration information of the multiple access network devices, the number and/or identifiers of the access network devices for the terminal to perform PRS measurement, the PRS resources whose measurement results are to be reported being spatially adjacent, the reported number of the spatially adjacent PRS resources, and the spatial arrangement order of the multiple PRS resources of each access network device which are indicated by the location server, the terminal determines the target PRS resources among the multiple PRS resources of the multiple access network devices.

In one embodiment, for each access network device in the multiple access network devices that the location server instructs the terminal to measure and report PRS resources, the terminal determines a main PRS resource among the multiple PRS resources of the access network device, and determines the reported number of adjacent PRS resources on both sides of the main PRS resource respectively, according to the spatial arrangement order of the multiple PRS resources of the access network device and the reported number of spatially adjacent PRS resources indicated by the location server. The determined main PRS resource and PRS resources adjacent to the main PRS resource are determined as the target PRS resources, and the target PRS resources are measured to obtain the measurement results of the target PRS resources. For the processes of determining the main PRS resource and the adjacent PRS resources on both sides of the main PRS resource, reference may be made to the processes of determining the first PRS resource and the second PRS resource(s) in the aforementioned embodiments respectively.

As an example, the number of access network devices that the location server instructs the terminal to perform PRS measurement is 3, the reported number of spatially adjacent PRS resources is N=2, and each access network device is configured with 8 PRS resources, and the spatial arrangement order of multiple PRS resources of the access network device TRP0 is shown in the following table (PRS resources are adjacent in order in the table):

main PRS resource is the PRS resource corresponding to PRS-ID3, and then determine two adjacent PRS resources on both sides of PRS-ID3 respectively, namely, the PRS resource corresponding to PRS-ID5 and the PRS resource corresponding to PRS-ID7, and the PRS resource corresponding to PRS-ID2 and the PRS resource corresponding to PRS-ID0, then determine the PRS resources respectively corresponding to PRS-ID5, PRS-ID7, PRS-ID3, PRS-ID2 and PRS-ID0 as the target PRS resources.

Further, according to the capability of the terminal, the next round of determination of the target PRS resources may be performed. In the next round, among 8 PRS resources of TRP0, a PRS resource whose quality of the signal transmitted ranks second in the order from good to poor as the main PRS resource, and then two adjacent PRS resources are determined on both sides of the main PRS resource respectively. For example, among 8 PRS resources of TRP0, a PRS resource whose quality of the signal transmitted ranks second in the order from good to poor is the PRS resource corresponding to PRS-ID6, the PRS resource corresponding to PRS-ID6 is determined as another main PRS resource, and then two adjacent PRS resources, namely the PRS resources corresponding to PRS-ID0 and PRS-ID1, and the PRS resources corresponding to PRS-ID4 and PRS-ID5, are determined on both sides of PRS-ID6 respectively. At this time, the PRS resources corresponding to PRS-ID0, PRS-ID1, PRS-ID6, PRS-ID4 and PRS-ID5 are determined as target PRS resources.

When the terminal reports the measurement results of the target PRS resources, PRS-ID5, PRS-ID7, PRS-ID3, PRS-ID2 and PRS-ID0 in the first round and PRS-ID0, PRS-ID1, PRS-ID6, PRS-ID4 and PRS-ID5 in the second round have a duplicate PRS resource: the PRS resource corresponding to PRS-ID5. For the PRS resource corresponding to PRS-ID5, the terminal may report the measurement result of the PRS resource corresponding to PRS-ID5 only once, without repeated reporting.

S905, the terminal sends measurement results of the target PRS resources to the location server.

In one embodiment, the terminal sends the measurement results of the target PRS resources and the identifiers of the target PRS resources to the location server to instruct the location server to determine the location information of the terminal. If the terminal performs multiple rounds of determination of target PRS resources, for the duplicate PRS resource in multiple rounds of target PRS resources, the terminal simply needs to report the PRS resource once, without repeated reporting.

S906, the location server determines location information of the terminal according to the measurement results of the target PRS resources and the angle information of the target PRS resources.

| PRS-ID5 | PRS-ID7 | PRS-ID3 | PRS-ID2 | PRS-ID0 | PRS-ID1 | PRS-ID6 | PRS-ID4 |

At this time, the terminal may determine, according to the attribute values of the PRS resources (including at least one of the signal-to-interference-plus-noise ratio, the signal-to-noise ratio or the RSRP), the PRS resource with the best transmission signal quality as the main PRS resource, for example, determine the PRS resource with the largest RSRP value among the 8 PRS resources of TRP0 as the main PRS resource. For example, the terminal may determine that the For the implementation principle and effect of S906, reference may be made to the aforementioned embodiment, which will not be repeated.

In the embodiment of the present application, the terminal receives the PRSs from the multiple access network devices, and for each access network device, the terminal reports, among PRS resources for transmitting multiple PRS of the access network device, the measurement results of the spatially adjacent target PRS resources to the location server according to the spatial arrangement order of the multiple PRS resources of the access network device indicated by the location server, thus improving the flexibility of reporting the measurement results of the PRS resources by the terminal, and further improving the accuracy of performing positioning on the terminal by the location server.

Figure 10:
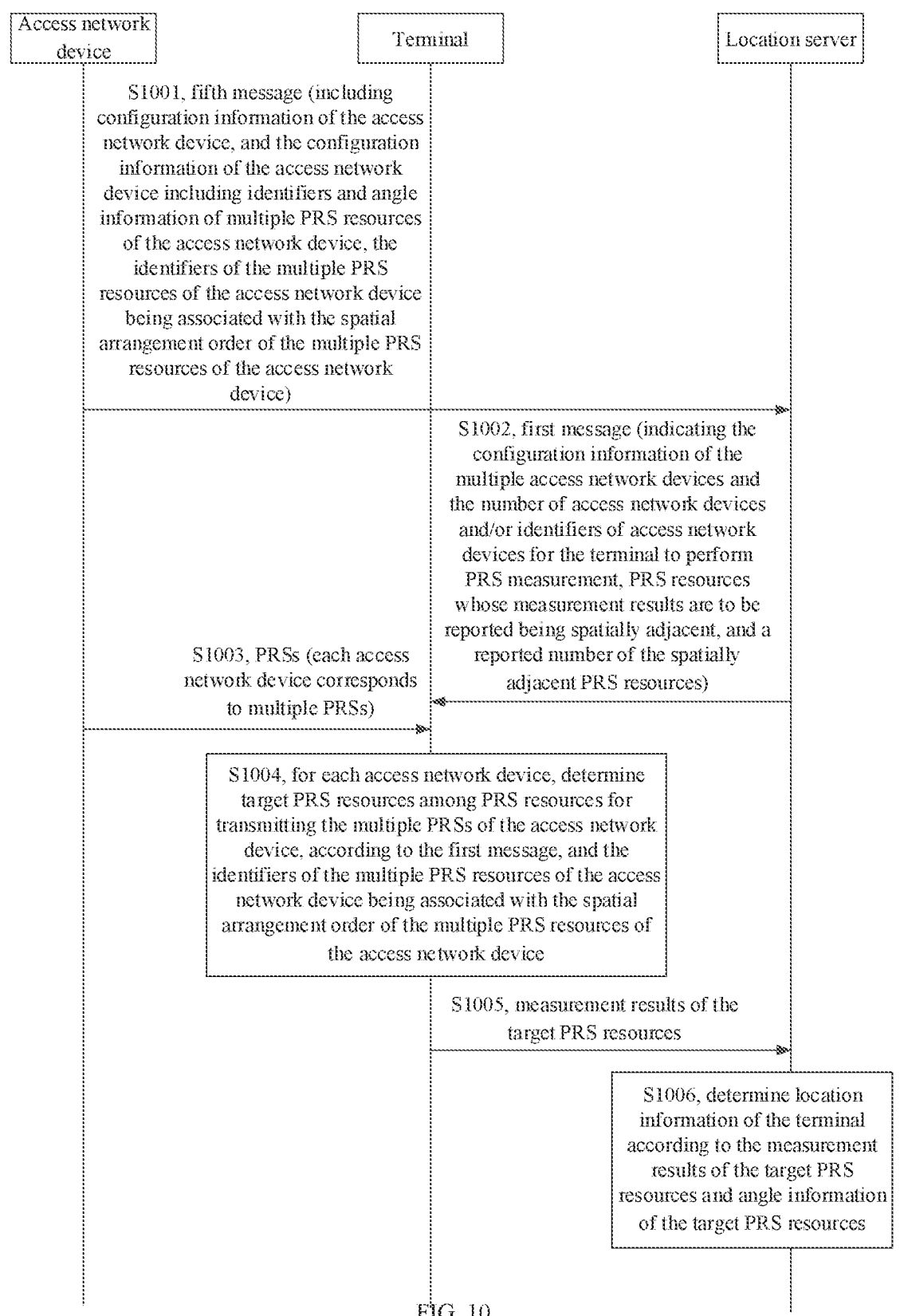
FIG. 10 is a schematic flowchart of a positioning method provided by another embodiment of the present application.

FIG. 10 is a schematic flowchart of a positioning method provided by another embodiment of the present application. As shown in FIG. 10, the method includes:

S1001, a location server receives fifth messages from multiple access network devices, where the fifth message includes configuration information of the access network device, and the configuration information of the access network device includes identifiers and angle information of multiple PRS resources of the access network device, and the identifiers of the multiple PRS resources of the access network device are associated with the spatial arrangement order of the multiple PRS resources of the access network device.

For the implementation principle and effect of S1001, reference may be made to the aforementioned embodiment, which will not be repeated.

It is predefined in the system that the identifiers of the multiple PRS resources of the access network device are associated with the spatial arrangement order of the multiple PRS resources of the access network device, that is, the identifiers of the multiple PRS resources of the access network device are determined in advance in the system according to the spatial arrangement order of the multiple PRS resources of the access network device, or the multiple PRS resources of the access network device are numbered in turn according to the spatial arrangement order of the multiple PRS resources of the access network device. Therefore, the arrangement order of the identifiers of the multiple PRS resources of the access network device is the spatial arrangement order of the multiple PRS resources of the access network device, and two PRS resources with adjacent identifiers meet spatial adjacency.

For example, in the location server or the access network device TRP0, the spatial arrangement order of the 8 PRS resources of TRP0 is determined according to the horizontal dimension angles and/or vertical dimension angles of the 8 PRS resources of TRP0. According to the spatial arrangement order of the 8 PRS resources of TRP0, the identifiers of the 8 PRS resources of TRP0 are determined as PRS-ID0, PRS-ID1, PRS-ID2, PRS-ID3, PRS-ID4, PRS-ID5, PRS- For the implementation principle and effect of S1002, reference may be made to the aforementioned embodiment, which will not be repeated.

S1003, the terminal receives PRSs from the multiple access network devices, where each access network device corresponds to multiple PRSs.

S1004, for each access network device, the terminal determines target PRS resources among PRS resources for transmitting the multiple PRSs of the access network device, according to the first message, and the identifiers of the multiple PRS resources of the access network device being associated with the spatial arrangement order of the multiple PRS resources of the access network device.

In one embodiment, for each access network device in the multiple access network devices that the location server instructs the terminal to measure and report PRS resources, the terminal determines the spatial arrangement order of the multiple PRS resources of the access network device according to the identifiers of the multiple PRS resources of the access network device. The main PRS resource is determined among the multiple PRS resources of the access network device, and the reported number of adjacent PRS resources are determined, according to the spatial arrangement order of the multiple PRS resources of the access network device, and the reported number of spatially adjacent PRS resources indicated by the location server, on both sides of the main PRS resource respectively. The determined main PRS resource and PRS resources adjacent to the main PRS resource are determined as the target PRS resources, and the target PRS resources are measured to obtain the measurement results of the target PRS resources. For the processes of determining the main PRS resource and the adjacent PRS resources on both sides of the main PRS resource, reference may be made to the processes of determining the first PRS resource and the second PRS resource (s) in the aforementioned embodiments respectively.

As an example, the number of access network devices that the location server instructs the terminal to perform PRS measurement is 3, the reported number of spatially adjacent PRS resources is N=2, and each access network device is configured with 8 PRS resources, and the spatial arrangement order of multiple PRS resources of the access network device TRP0 is shown in the following table (PRS resources are adjacent in order in the table):

| PRS-ID0 | PRS-ID1 | PRS-ID2 | PRS-ID3 | PRS-ID4 | PRS-ID5 | PRS-ID6 | PRS-ID7 |
| --- | --- | --- | --- | --- | --- | --- | --- |

ID6 and PRS-ID7 respectively. Among the 8 PRS resources of TRP0, the PRS resource corresponding to PRS-ID0 is adjacent to the PRS resource corresponding to PRS-ID1, the PRS resource corresponding to PRS-ID1 is adjacent to the PRS resource corresponding to PRS-ID2, and so on.

S1002, the location server sends a first message to a terminal, where the first message is used for indicating the configuration information of the multiple access network devices and the number and/or identifiers of access network devices for the terminal to perform PRS measurement, and the first message is also used for indicating PRS resources whose measurement results are to be reported being spatially adjacent, and a reported number of the spatially adjacent PRS resources.

At this time, the terminal may determine, according to the attribute values of the PRS resources (including at least one of the signal-to-interference-plus-noise ratio, the signal-to-noise ratio or the RSRP), the PRS resource with the best transmission signal quality as the main PRS resource, for example, determine the PRS resource with the largest RSRP value among the 8 PRS resources of TRP0 as the main PRS resource. For example, the terminal may determine that the main PRS resource is the PRS resource corresponding to PRS-ID3, and then determine two adjacent PRS resources on both sides of PRS-ID3 respectively, namely, the PRS resource corresponding to PRS-ID1 and the PRS resource corresponding to PRS-ID2, and the PRS resource corresponding to PRS-ID4 and the PRS resource corresponding to PRS-ID5, and then determine the determined main PRS resource and the adjacent PRS resources on both sides of the main PRS resource as the target PRS resources. Further, the next round of determination of the target PRS resources may be performed according to the capability of the terminal. For example, in the next round, a PRS resource with the second largest RSRP among the 8 PRS resources of TRP0 is determined as the main PRS resource, and two adjacent PRS resources are determined on both sides of the main PRS resource respectively.

S1005, the terminal sends measurement results of the target PRS resources to the location server.

For the implementation principle and effect of S1005, reference may be made to the aforementioned embodiments, which will not be repeated.

S1006, the location server determines location information of the terminal according to the measurement results of the target PRS resources and the angle information of the target PRS resources.

For the implementation principle and effect of S1006, reference may be made to the aforementioned embodiments, which will not be repeated.

In the embodiment of the present application, the terminal receives the PRSs from the multiple access network devices, and for each access network device, the terminal determines, according to the indication of the location server and the identifiers of the multiple PRS resources of the access network device being associated with the spatial arrangement order of the multiple PRS resources of the access network device, the spatially adjacent target PRS resources among PRS resources for transmitting multiple PRS of the access network device, and reports the measurement results of the target PRS resources to the location server, which improves the flexibility of reporting the measurement results of the PRS resources by the terminal, and improves the accuracy of performing positioning on the terminal by the location server.

Figure 11:
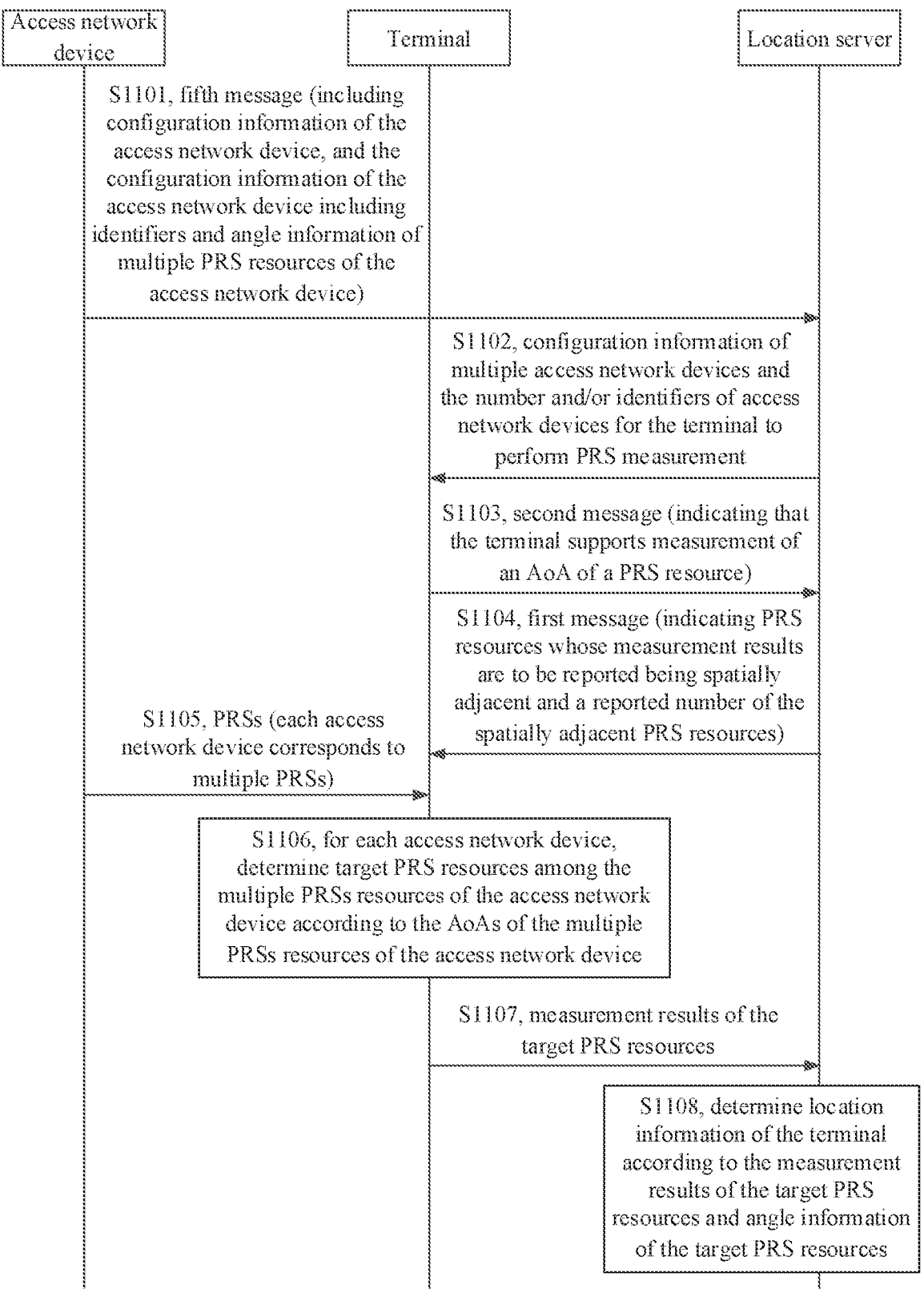
FIG. 11 is a schematic flowchart of a positioning method provided by another embodiment of the present application.

FIG. 11 is a schematic flowchart of a positioning method provided by another embodiment of the present application. As shown in FIG. 10, the method includes:

S1101, a location server receives fifth messages from multiple access network devices, where the fifth message includes configuration information of the access network device, and the configuration information of the access network device includes identifiers and angle information of multiple PRS resources of the access network device.

For the implementation principle and effect of S1101, reference may be made to the aforementioned embodiments, which will not be repeated.

S1102, the location server sends to the terminal the configuration information of the multiple access network devices and the number and/or identifiers of access network devices for the terminal to perform PRS measurement.

For the implementation principle and effect of S1102, reference may be made to the aforementioned embodiments, which will not be repeated.

S1103, the terminal sends a second message to the location server, where the second message is used for indicating that the terminal supports measurement of an AoA of a PRS resource.

S1104, the location server sends a first message to a terminal, where the first message is used for indicating PRS resources whose measurement results are to be reported being spatially adjacent and a reported number of the spatially adjacent PRS resources.

In one embodiment, after receiving the second message, the location server knows that the terminal supports measurement of the AoA of the PRS resource, and further determines that the terminal can determine the spatial arrangement order of the multiple PRS resources of the access network device. Therefore, the location server sends the first message to the terminal, which instructs the terminal to report the measurement results of spatially adjacent PRS resources and the reported number of the spatially adjacent PRS resources.

S1105, the terminal receives PRSs from the multiple access network devices, where each access network device corresponds to multiple PRSs.

S1106, for each access network device, the terminal determines target PRS resources among the multiple PRSs resources of the access network device according to the AoAs of the multiple PRSs resources of the access network device.

In one embodiment, for each access network device in the multiple access network devices that the location server instructs the terminal to measure and report PRS resources, the terminal performs AoA measurement on each PRS resource of the access network device to obtain the AoA of each PRS resource of the access network device, and determines, according to the AoA of each PRS resource of the access network device, the spatial arrangement order of the multiple PRS resources of the access network device. In one embodiment, reference may be made to the relevant description in the aforementioned embodiments.

In one embodiment, for each access network device, the terminal determines a main PRS resource among the multiple PRS resources of the access network device, and determines the reported number of adjacent PRS resources on both sides of the main PRS resource respectively, according to the spatial arrangement order of the multiple PRS resources of the access network device and the reported number of spatially adjacent PRS resources indicated by the location server. The determined main PRS resource and PRS resources adjacent to the main PRS resource are determined as the target PRS resources, and the target PRS resources are measured to obtain the measurement results of the target PRS resources. For the processes of determining the main PRS resource and the adjacent PRS resources on both sides of the main PRS resource, reference may be made to the processes of determining the first PRS resource and the second PRS resource(s) in the aforementioned embodiments respectively.

S1107, the terminal sends measurement results of the target PRS resources to the location server.

For the implementation principle and effect of S1107, reference may be made to the aforementioned embodiments, which will not be repeated.

S1108, the location server determines location information of the terminal according to the measurement results of the target PRS resources and the angle information of the target PRS resources.

For the implementation principle and effect of S1108, reference may be made to the aforementioned embodiments, which will not be repeated.

In one embodiment, after receiving the second message, the location server may also indicate to the terminal the spatial arrangement order of the multiple PRS resources from the access network device, or the spatial arrangement order of the multiple PRS resources of the access network device predefined by the system, to assist the terminal to more accurately determine whether a transmission channel corresponding to the RSRP of the PRS resource belongs to a LOS path. At this time, the measurement result of the PRS resource includes the RSRP of the PRS resource and whether the transmission channel corresponding to the RSRP belongs to the LOS path, thus enriching the measurement result of the PRS resource and further advantageously improving the accuracy of the terminal's positioning.

In the embodiment of the present application, the terminal receives the PRSs of the multiple access network devices, and for each access network device, the terminal determines, according to the indication of the location server, and the AoAs of the multiple PRS resources of the access network device, the spatially adjacent target PRS resources among PRS resources for transmitting the multiple PRS of the access network device, and reports the measurement results of the target PRS resources to the location server, which improves the flexibility of reporting the measurement results of the PRS resources by the terminal, and improves the accuracy of performing positioning on the terminal by the location server.

Figure 12:
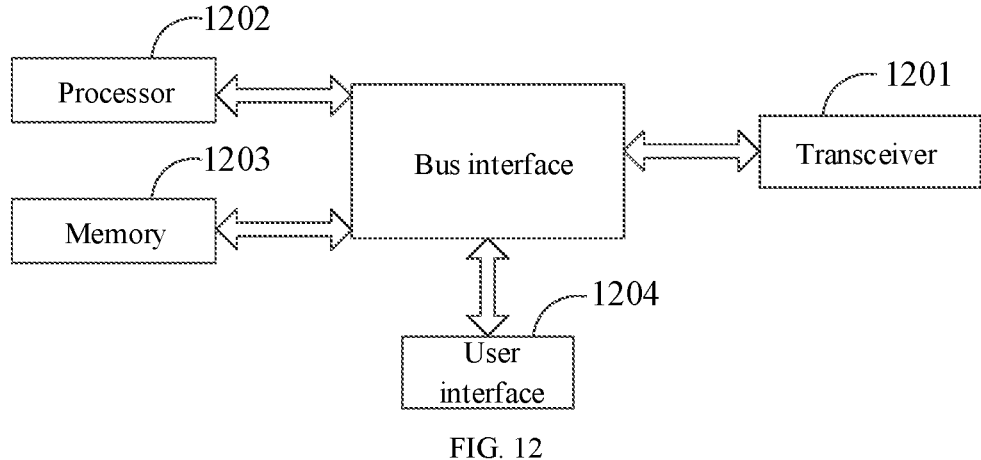
FIG. 12 is a schematic structural diagram of a positioning apparatus provided by an embodiment of the present application.

On the terminal side, an embodiment of the present application provides a positioning apparatus. As shown in FIG. 12. The positioning apparatus of this embodiment may be a terminal, and the positioning apparatus may include a transceiver 1201, a processor 1202, and a memory 1203.

The transceiver 1201 is configured to receive and transmit data under control of the processor 1202.

In FIG. 12, a bus architecture may include any number of interconnected buses and bridges. In one embodiment, one or more processors represented by the processor 1202 and various circuits of memory represented by the memory 1203 are linked together. The bus architecture may also link various other circuits together, such as, a peripheral device, a voltage regulator and a power management circuit, which are well known in the art and will not be further described herein. The bus interface provides interfaces. The transceiver 1201 may be multiple elements, including a transmitter and a receiver, providing a device for communicating with various other devices via a transmission medium, the transmission medium includes a wireless channel, a wired channel, an optical cable or other transmission mediums. In one embodiment, the positioning apparatus may further include a user interface 1204. For different user equipment, the user interface 1204 may also be an interface that can connect required devices externally and internally. The connected device includes, but is not limited to, a keypad, a display, a speaker, a microphone, a joystick, etc.

The processor 1202 is responsible for managing the bus architecture and general processing, and the memory 1203 may store data used by the processor 1202 when performing an operation.

In one embodiment, the processor 1202 may be a central processing unit (CPU), an application specific integrated circuit (ASIC), a field-programmable gate array (FPGA) or a complex programmable logic device (CPLD), and the processor 1202 may also adopt a multi-core architecture.

The processor 1202 is configured to execute any of the methods related to the terminal provided by the embodiments of the present application according to the obtained executable instructions by calling the computer program stored in the memory 1203. The processor 1202 and memory 1203 may also be physically separated.

In one embodiment, when executing the computer program stored in the memory 1203, the processor 1202 implements the following operations: receiving PRSs from multiple access network devices, where each access network device corresponds to multiple PRSs; for each access network device, determining at least two target PRS resources that are spatially adjacent among PRS resources for transmitting the multiple PRSs of the access network device; sending measurement results of the target PRS resources to a location server, where the measurement result of the target PRS resource is used for instructing the location server to determine location information of the terminal.

In one embodiment, the processor 1202 is further configured to perform the following operations: for each access network device, determining a spatial arrangement order of the multiple PRS resources of the access network device; determining the target PRS resources among the multiple PRS resources of the access network device according to the spatial arrangement order of the multiple PRS resources of the access network device.

In one embodiment, the processor 1202 is further configured to perform the following operations: for each access network device, acquiring the spatial arrangement order of the multiple PRS resources of the access network device from configuration information of the access network device.

In one embodiment, for each access network device, identifiers of the multiple PRS resources of the access network device are associated with the spatial arrangement order of the multiple PRS resources of the access network device, the processor 1202 is further configured to perform the following operations: for each access network device, acquiring the identifiers of the multiple PRS resources of the access network device from configuration information of the access network device; and determining the target PRS resources according to the identifiers of the multiple PRS resources of the access network device.

In one embodiment, the processor 1202 is further configured to perform the following operations: for each access network device, acquiring angle information of the multiple PRS resources of the access network device from configuration information of the access network device; and determining the spatial arrangement order of the multiple PRS resources of the access network device according to the angle information of the multiple PRS resources of the access network device; where the angle information of the PRS resource includes a horizontal dimension angle of the PRS resource and/or a vertical dimension angle of the PRS resource.

In one embodiment, the processor 1202 is further configured to perform the following operations: for each access network device, determining AoAs of the multiple PRS resources of the access network device, and determining the spatial arrangement order of the multiple PRS resources of the access network device according to the AoAs of the multiple PRS resources of the access network device.

In one embodiment, a measurement result of the PRS resource includes an RSRP of the PRS resource and whether a transmission channel corresponding to the RSRP of the PRS resource belongs to a LOS path.

In one embodiment, the processor 1202 is further configured to perform the following operations: receiving a first message from the location server, where the first message is used for indicating a preset condition that PRS resources whose measurement results are to be reported should meet; determining the target PRS resources according to the first message.

In one embodiment, the preset condition is identifiers of the PRS resources whose measurement results are to be reported, the processor 1202 is further configured to perform the following operations: determining that the target PRS resources are PRS resources corresponding to the identifiers of the PRS resources whose measurement results are to be reported among the multiple PRS resources of the access network device.

In one embodiment, the preset condition is that attribute values of the PRS resources whose measurement results are to be reported meet a preset threshold, the processor 1202 is further configured to perform the following operations: determining the target PRS resources according to a spatial arrangement order of the multiple PRS resources among the multiple PRS resources of the access network device; and screening, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, the preset condition is that the PRS resources whose measurement results are to be reported are not limited by spatial adjacency, the processor 1202 is further configured to perform the following operations: screening the target PRSs according to qualities of PRSs transmitted by the target PRS resources.

In one embodiment, the preset condition is that the PRS resources whose measurement results are to be reported are limited by spatial adjacency, the processor 1202 is further configured to perform the following operations: sending a second message to the location server, where the second message is used for indicating that the terminal supports measurement of an AoA of a PRS resource.

In one embodiment, the first message is further used for indicating to the terminal a reported number of spatially adjacent PRS resources.

In one embodiment, the processor 1202 is further configured to perform the following operations: determining a first PRS resource among the multiple PRS resources of the access network device; determining one or more second PRS resources for the first PRS resource; and determining that the target PRS resources are the first PRS resource and the second PRS resource.

In one embodiment, the processor 1202 is further configured to perform the following operations: receiving a third message from the location server, where the third message is used for indicating a reported number of the first PRS resource and/or a reported number of the second PRS resource.

In one embodiment, the processor 1202 is further configured to perform the following operations: receiving a fourth message from the location server, where the fourth message includes configuration information of the multiple access network devices;

where the configuration information of the access network device includes at least one of the following: a spatial arrangement order of the multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

It should be noted here that the above apparatus provided in the present application can realize all the method steps realized by the terminal in the above method embodiments, and can achieve the same effect. The same parts and beneficial effects in this embodiment and the method embodiments will not be described herein in detail.

Figure 13:
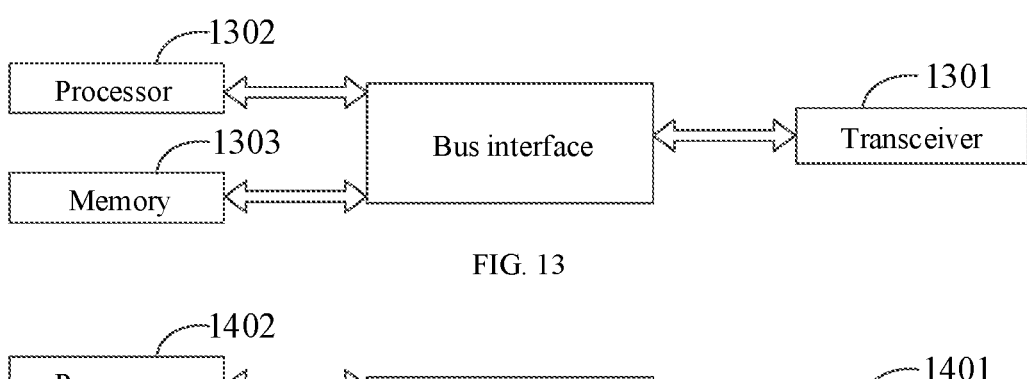
FIG. 13 is a schematic structural diagram of a positioning apparatus provided by another embodiment of the present application.

On the network side, an embodiment of the present application provides a positioning apparatus. As shown in FIG. 13, the positioning apparatus of this embodiment may be a location server, and the positioning apparatus may include a transceiver 1301, a processor 1302, and a memory 1303.

The transceiver 1301 is configured to receive and transmit data under control of the processor 1302.

In FIG. 13, a bus architecture may include any number of interconnected buses and bridges. In one embodiment, one or more processors represented by the processor 1302 and various circuits of memory represented by the memory 1303 are linked together. The bus architecture may also link various other circuits together, such as, a peripheral device, a voltage regulator and a power management circuit, which are well known in the art and will not be further described herein. The bus interface provides interfaces. The transceiver 1301 may be multiple elements, including a transmitter and a receiver, providing a device for communicating with various other devices via a transmission medium, the transmission medium includes a wireless channel, a wired channel, an optical cable and other transmission mediums.

The processor 1302 is responsible for managing the bus architecture and general processing, and the memory 1303 may store data used by the processor 1302 when performing an operation.

In one embodiment, the processor 1302 may be a CPU, an ASIC, an FPGA or a CPLD, and the processor 1302 may also adopt a multi-core architecture.

The processor 1302 is configured to execute any of the methods related to the location server provided by the embodiments of the present application according to the obtained executable instructions by calling the computer program stored in the memory 1303. The processor 1302 and memory 1303 may also be physically separated.

In one embodiment, when executing the computer program stored in the memory 1303, the processor 1302 implements the following operations: receiving measurement results of target PRS resources of multiple access network devices from a terminal, where the target PRS resources of the access network device are spatially adjacent;

determining location information of the terminal according to the measurement results of the target PRS resources and angle information of the target PRS resources, where the angle information of the target PRS resource includes a horizontal dimension angle of the target PRS resource and/or a vertical dimension angle of the target PRS resource.

In one embodiment, the processor 1302 is further configured to perform the following operations: sending a first message to the terminal, where the first message is used for indicating a preset condition that PRS resources whose measurement results are to be reported should meet; where the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; where the attribute value includes at least one of the following: a signal-to-interference-plus-noise ratio, a signal-to-noise ratio, or an RSRP.

In one embodiment, the preset condition is that the PRS resources whose measurement results are to be reported are limited by the spatial adjacency, the processor 1302 is further configured to perform the following operations: receiving a second message from the terminal, where the second message is used for indicating that the terminal supports measurement of an AoA of a PRS resource.

In one embodiment, a measurement result of the PRS resource includes an RSRP of the PRS resource and whether a transmission channel corresponding to the RSRP of the PRS resource belongs to a LOS path.

In one embodiment, the first message is further used for indicating to the terminal a reported number of spatially adjacent PRS resources.

In one embodiment, the processor 1302 is further configured to perform the following operations: sending a fourth message to the terminal, where the fourth message includes configuration information of the multiple access network devices, the configuration information of the access network device includes at least one of the following: a spatial arrangement order of multiple PRS resources of the access network device, identifiers of the multiple PRS resources of the access network device, or angle information of the multiple PRS resources of the access network device.

In one embodiment, the processor 1302 is further configured to perform the following operations: receiving a fifth message sent by the access network device, where the fifth message includes the configuration information of the access network device.

It should be noted here that the above apparatus provided in the present application can realize all the method steps realized by the location server in the above method embodiments, and can achieve the same effect. The same parts and beneficial effects in this embodiment and the method embodiments will not be described herein in detail.

Figure 14:
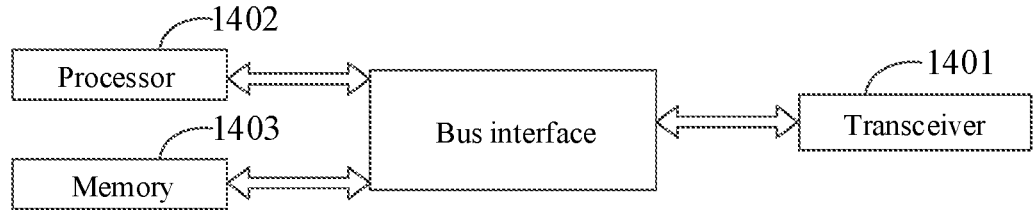
FIG. 14 is a schematic structural diagram of a positioning apparatus provided by another embodiment of the present application.

On the network side, an embodiment of the present application also provides a positioning apparatus. As shown in FIG. 14, the positioning apparatus of this embodiment may be an access network device, and the positioning apparatus may include: a transceiver 1401, a processor 1402 and a memory 1403.

The transceiver 1401 is configured to receive and transmit data under control of the processor 1402.

In FIG. 14, a bus architecture may include any number of interconnected buses and bridges. In one embodiment, one or more processors represented by the processor 1402 and various circuits of memory represented by the memory 1403 are linked together. The bus architecture may also link various other circuits together, such as, a peripheral device, a voltage regulator and a power management circuit, which are well known in the art and will not be further described herein. The bus interface provides interfaces. The transceiver 1401 may be multiple elements, including a transmitter and a receiver, providing a device for communicating with various other devices via a transmission medium, the transmission medium includes a wireless channel, a wired channel, an optical cable and other transmission mediums.

The processor 1402 is responsible for managing the bus architecture and general processing, and the memory 1403 may store data used by the processor 1402 when performing an operation.

In one embodiment, the processor 1402 may be a CPU, an ASIC, an FPGA or a CPLD, and the processor 1402 may also adopt a multi-core architecture.

The processor 1402 is configured to execute any of the methods related to the access network device provided by the embodiments of the present application according to the obtained executable instructions by calling the computer program stored in the memory 1403. The processor 1402 and memory 1403 may also be physically separated.

In one embodiment, when executing the computer program stored in the memory 1403, the processor 1402 implements the following operations: sending a fifth message to a location server, where the fifth message includes configuration information of the access network device, the configuration information of the access network device includes at least one of the following: a spatial arrangement order of multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment, the identifiers of the multiple PRS resources are associated with the spatial arrangement order of the multiple PRS resources.

Figure 15:
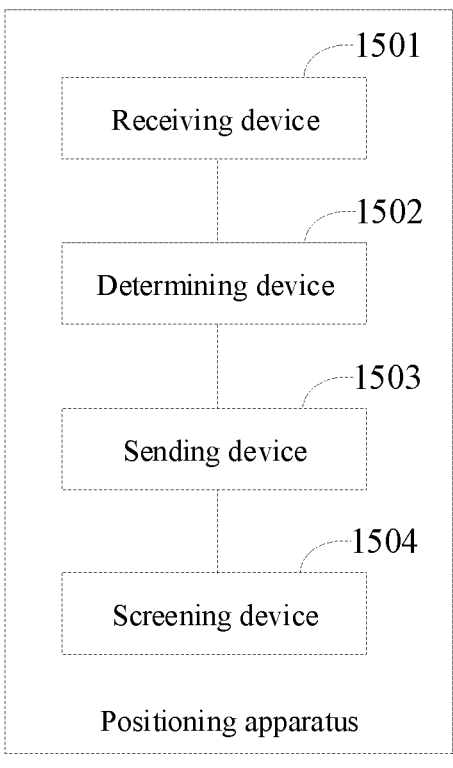
FIG. 15 is a schematic structural diagram of a positioning apparatus provided by another embodiment of the present application.

On the terminal side, an embodiment of the present application provides a positioning apparatus. As shown in FIG. 15, the positioning apparatus of this embodiment may be a terminal, and the positioning apparatus includes:

a receiving device 1501, configured to receive PRSs from multiple access network devices, where each access network device corresponds to multiple PRSs;

a determining device 1502, configured to, for each access network device, determine at least two target PRS resources that are spatially adjacent among PRS resources for transmitting the multiple PRSs of the access network device;

a sending device 1503, configured to send measurement results of the target PRS resources to a location server, where the measurement result of the target PRS resource is used for instructing the location server to determine location information of the terminal.

In one embodiment, the determining device 1502 is configured to: for each access network device, determine a spatial arrangement order of the multiple PRS resources of the access network device; determine the target PRS resources among the multiple PRS resources of the access network device according to the spatial arrangement order of the multiple PRS resources of the access network device.

In one embodiment, the determining device 1502 is configured to: for each access network device, acquire the spatial arrangement order of the multiple PRS resources of the access network device from configuration information of the access network device.

In one embodiment, for each access network device, identifiers of the multiple PRS resources of the access network device are associated with the spatial arrangement order of the multiple PRS resources of the access network device, the determining device 1502 is configured to: for each access network device, acquire the identifiers of the multiple PRS resources of the access network device from configuration information of the access network device; and determine the target PRS resources according to the identifiers of the multiple PRS resources of the access network device.

In one embodiment, the determining device 1502 is configured to: for each access network device, acquire angle information of the multiple PRS resources of the access network device from configuration information of the access network device; and determine the spatial arrangement order of the multiple PRS resources of the access network device according to the angle information of the multiple PRS resources of the access network device; where the angle information of the PRS resource includes a horizontal dimension angle of the PRS resource and/or a vertical dimension angle of the PRS resource.

In one embodiment, the determining device 1502 is configured to: for each access network device, determine AoAs of the multiple PRS resources of the access network device; and determine the spatial arrangement order of the multiple PRS resources of the access network device according to the AoAs of the multiple PRS resources of the access network device.

In one embodiment, a measurement result of the PRS resource includes an RSRP of the PRS resource and whether a transmission channel corresponding to the RSRP of the PRS resource belongs to a LOS path.

In one embodiment, the receiving device 1501 is further configured to: receive a first message from the location server, where the first message is used for indicating a preset condition that PRS resources whose measurement results are to be reported should meet.

At this point, the positioning apparatus further includes:
a screening device 1504, configured to determine the target PRS resources according to the first message.

In one embodiment, the preset condition is identifiers of the PRS resources whose measurement results are to be reported, the screening device 1504 is configured to: determine that the target PRS resources are PRS resources corresponding to the identifiers of the PRS resources whose measurement results are to be reported among the multiple PRS resources of the access network device.

In one embodiment, the preset condition is that attribute values of the PRS resources whose measurement results are to be reported meet a preset threshold, the screening device 1504 is configured to: determine the target PRS resources according to a spatial arrangement order of the multiple PRS resources among the multiple PRS resources of the access network device; and screen, among the target PRS resources, target PRS resources whose attribute values meet the preset threshold, where the attribute value includes at least one of the following: a signal-to-interference-plus-noise ratio, a signal-to-noise ratio, or an RSRP.

In one embodiment, the preset condition is that the PRS resources whose measurement results are to be reported are not limited by spatial adjacency, the screening device 1504 is configured to: screen the target PRSs according to qualities of PRSs transmitted by the target PRS resources.

In one embodiment, the preset condition is that the PRS resources whose measurement results are to be reported are limited by spatial adjacency, the sending device 1503 is further configured to: send a second message to the location server, where the second message is used for indicating that the terminal supports measurement of an AoA of a PRS resource.

In one embodiment, the first message is further used for indicating to the terminal a reported number of spatially adjacent PRS resources.

In one embodiment, the determining device 1502 is configured to: determine a first PRS resource among the multiple PRS resources of the access network device; determine one or more second PRS resources for the first PRS resource; and determine that the target PRS resources are the first PRS resource and the second PRS resource.

In one embodiment, the receiving device 1501 is further configured to: receive a third message from the location server, where the third message is used for indicating a reported number of the first PRS resource and/or a reported number of the second PRS resource.

In one embodiment, the receiving device 1501 is further configured to: receive a fourth message from the location server, where the fourth message includes configuration information of the multiple access network devices; where the configuration information of the access network device includes at least one of the following: a spatial arrangement order of the multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

It should be noted here that the above apparatus provided in the present application can realize all the method steps realized by the terminal in the above method embodiments, and can achieve the same effect. The same parts and beneficial effects in this embodiment and the method embodiments will not be described herein in detail.

Figure 16:
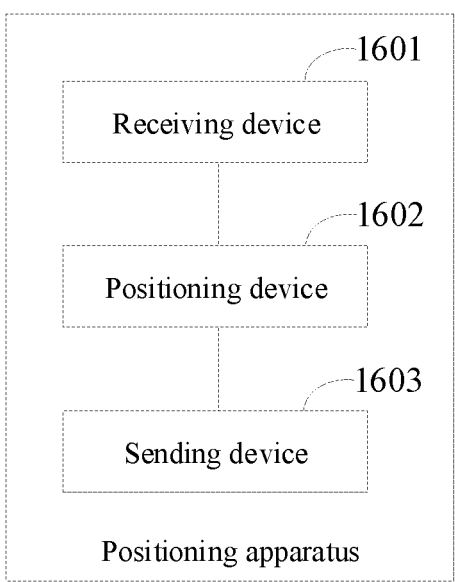
FIG. 16 is a schematic structural diagram of a positioning apparatus provided by another embodiment of the present application.

On the network side, an embodiment of the present application provides a positioning apparatus. As shown in FIG. 16, the positioning apparatus of this embodiment may be a location server, and the positioning apparatus includes:
a receiving device 1601, configured to receive measurement results of target PRS resources of multiple access network devices from a terminal, where the target PRS resources of the access network device are spatially adjacent;
a positioning device 1602, configured to determine location information of the terminal according to the measurement results of the target PRS resources and angle information of the target PRS resources, where the angle information of the target PRS resource includes a horizontal dimension angle of the target PRS resource and/or a vertical dimension angle of the target PRS resource.

In one embodiment, the positioning apparatus further includes:
a sending device 1603, configured to send a first message to the terminal, where the first message is used for indicating a preset condition that PRS resources whose measurement results are to be reported should meet; where the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; where the attribute value includes at least one of the following: a signal-to-interference-plus-noise ratio, a signal-to-noise ratio, or an RSRP.

In one embodiment, the preset condition is that the PRS resources whose measurement results are to be reported are limited by the spatial adjacency, the sending device 1603 is further configured to: receive a second message from the terminal, where the second message is used for indicating that the terminal supports measurement of an AoA of a PRS resource.

In one embodiment, a measurement result of the PRS resource includes an RSRP of the PRS resource and whether a transmission channel corresponding to the RSRP of the PRS resource belongs to a LOS path.

In one embodiment, the first message is further used for indicating to the terminal a reported number of spatially adjacent PRS resources.

In one embodiment, the sending device 1603 is further configured to: send a fourth message to the terminal, where the fourth message includes configuration information of the multiple access network devices, the configuration information of the access network device includes at least one of the following: a spatial arrangement order of multiple PRS resources of the access network device, identifiers of the multiple PRS resources of the access network device, or angle information of the multiple PRS resources of the access network device.

In one embodiment, the receiving device 1601 is further configured to: receive a fifth message sent by the access network device, where the fifth message includes the configuration information of the access network device.

It should be noted here that the above apparatus provided in the present application can realize all the method steps realized by the location server in the above method embodiments, and can achieve the same effect. The same parts and beneficial effects in this embodiment and the method embodiments will not be described herein in detail.

Figure 17:
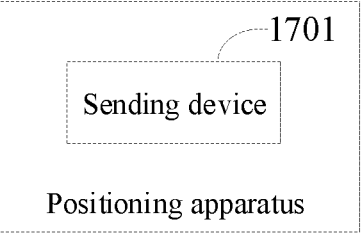
FIG. 17 is a schematic structural diagram of a positioning apparatus provided by another embodiment of the present application.

On the network side, an embodiment of the present application also provides a positioning apparatus. As shown in FIG. 17, the positioning apparatus of this embodiment may be an access network device, and the positioning apparatus includes:

a sending device 1701, configured to send a fifth message to a location server, where the fifth message includes configuration information of the access network device, the configuration information of the access network device includes at least one of the following: a spatial arrangement order of multiple PRS resources of the access network device, identifiers of the multiple PRS resources of the access network device, or angle information of the multiple PRS resources of the access network device, where the angle information of the PRS resource includes a horizontal dimension angle of the PRS resource and/or a vertical dimension angle of the PRS resource.

In one embodiment, the identifiers of the multiple PRS resources are associated with the spatial arrangement order of the multiple PRS resources.

It should be noted here that the above apparatus provided by the present application can realize all the method steps realized by the access network device in the above method embodiments, and can achieve the same effect. The same parts and beneficial effects in this embodiment and the method embodiments will not be described herein in detail.

It should be noted that the division of devices in the embodiment of the present application is illustrative, and is only a logical function division, there may be other division manners in actual implementations. In addition, each functional device in each embodiment of the present application may be integrated in one processing device, or may exist physically alone, or two or more devices be integrated in one device. The above integrated device may be implemented in a form of hardware or software functional unit.

If the integrated device is implemented in the form of software functional unit and sold or used as an independent product, it may be stored in a processor-readable storage medium. Based on this understanding, the embodiment of the present application or the part that contributes to the existing technology or all or part of the embodiments may be embodied in the form of a software product, which is stored in a storage medium and includes several instructions to enable a computer device (which may be a personal computer, a server, or a network device, etc.) or a processor to perform all or a part of the steps of the method described in the embodiments of the present application. The aforementioned storage medium includes: a USB flash disk, a removable hard disk, a read-only memory (ROM), a random access memory (RAM), a magnetic disk or an optical disk and other medium that can store a program code.

On the terminal side, an embodiment of the present application provides a processor-readable storage medium. The processor-readable storage medium stores a computer program, which is used to enable a processor to perform any of the methods related to the terminal provided by the embodiments of the present application. It enables the processor to realize all the method steps realized by the terminal in the above method embodiments, and can achieve the same effect. The same parts and beneficial effects in this embodiment and the method embodiments will not be described herein in detail.

On the network side, an embodiment of the present application provides a processor-readable storage medium. The processor-readable storage medium stores a computer program, which is used to enable a processor to perform any of the methods related to the location server or access network device provided by the embodiments of the present application. It enables the processor to realize all the method steps realized by the location server or access network device in the above method embodiments, and can achieve the same effect. The same parts and beneficial effects in this embodiment and the method embodiments will not be described herein in detail.

The processor-readable storage medium may be any available medium or data storage device that the processor can access, including but not limited to a magnetic memory (such as, a floppy disk, a hard disk, a magnetic tape, a magneto-optical disk (MO), etc.), an optical memory (such as, a CD, a DVD, a BD, an HVD, etc.), and a semiconductor memory (such as, an ROM, an EPROM, an EEPROM, a non-volatile memory (NAND FLASH), a solid-state hard disk (SSD), etc.).

On the terminal side, an embodiment of the present application provides a computer program product including an instruction; when the instruction is run on a computer, enabling the computer to execute all the method steps realized by the terminal in the above method embodiments, and achieve the same effect. The same parts and beneficial effects in this embodiment and the method embodiments will not be described herein in detail.

On the network side, an embodiment of the present application provides a computer program product including an instruction; when the instruction is run on a computer, enabling the computer to execute all the method steps realized by the location server or access network device in the above method embodiments, and achieve the same effect. The same parts and beneficial effects in this embodiment and the method embodiments will not be described herein in detail.

The embodiments of the present application can be provided as a method, a system, or a computer program product. Therefore, the present application may take the form of a complete hardware embodiment, a complete software embodiment, or an embodiment combining software and hardware aspects. Embodiments of the present application may take the form of a computer program product implemented on one or more computer-usable storage mediums (including but not limited to a disk memory and an optical memory, etc.) including computer-usable program codes.

The present application is described with reference to flow charts and/or block diagrams of the method, apparatus, and computer program product according to the embodiment of the present application. It should be understood that each flow and/or block in the flow charts and/or block diagrams and the combination of flow and/or block in the flow charts and/or block diagrams can be realized by computer-executable instructions. These computer-executable instructions can be provided to a processor of a general purpose computer, a special purpose computer, an embedded processor or other programmable data processing devices to generate a machine, and the instructions executed by the processor of a computer or other programmable data processing devices generate a means for realizing the functions specified in one or more processes and/or one or more blocks of a flowchart.

These processor-executable instructions may also be stored in the processor-readable memory that can guide the computer or other programmable data processing devices to work in a specific way, and the instructions stored in the processor-readable memory generate a manufacturing product including an instruction apparatus, which implements the functions specified in one or more flows of the flowchart and/or one or more blocks of the diagram.

These processor-executable instructions may also be loaded on a computer or other programmable data processing devices to enable a series of operation steps to be performed on the computer or other programmable devices to generate computer-implemented processing, and the instructions executed on the computer or other programmable devices provide steps for realizing the functions specified in one or more processes of the flowchart and/or one or more blocks of the diagram.

The invention claimed is:

1. A positioning method applied to a terminal, wherein the positioning method comprises:

receiving positioning reference signals (PRSs) from multiple access network devices, wherein each access network device corresponds to multiple PRSs;

for each access network device, determining at least two target PRS resources among multiple PRS resources for transmitting the multiple PRSs of the access network device;

sending measurement results of the target PRS resources to a location server, wherein the measurement result of the target PRS resource are used for instructing the location server to determine location information of the terminal;

wherein for each access network device, determining the at least two target PRS resources among the multiple PRS resources for transmitting the multiple PRSs of the access network device comprises:

determining a first PRS resource among the multiple PRS resources of the access network device; determining one or more second PRS resources for the first PRS resource; and determining that the target PRS resources are the first PRS resource and the second PRS resource.

2. The positioning method according to claim 1, wherein for each access network device, determining the spatial arrangement order of the multiple PRS resources of the access network device comprises:

for each access network device, acquiring the spatial arrangement order of the multiple PRS resources of the access network device from configuration information of the access network device; or, for each access network device, acquiring angle information of the multiple PRS resources of the access network device from configuration information of the access network device, and determining the spatial arrangement order of the multiple PRS resources of the access network device according to the angle information of the multiple PRS resources of the access network device, wherein the angle information of the PRS resource comprises a horizontal dimension angle of the PRS resource and/or a vertical dimension angle of the PRS resource; or, for each access network device, determining angles of arrival (AoAs) of the multiple PRS resources of the access network device, and determining the spatial arrangement order of the multiple PRS resources of the access network device according to the AoAs of the multiple PRS resources of the access network device.

3. The positioning method according to claim 1, wherein for each access network device, determining the at least two target PRS resources among the PRS resources for transmitting the multiple PRSs of the access network device comprises:

for each access network device, acquiring identifiers of the multiple PRS resources of the access network device from configuration information of the access network device, and determining the target PRS resources according to the identifiers of the multiple PRS resources of the access network device, wherein the identifiers of the multiple PRS resources of the access network device are associated with the spatial arrangement order of the multiple PRS resources of the access network device.

4. The positioning method according to claim 1, wherein a measurement result of the PRS resource comprises a reference signal received power (RSRP) of the PRS resource and whether a transmission channel corresponding to the RSRP of the PRS resource belongs to a line of sight (LOS) path.

5. The positioning method according to claim 1, wherein for each access network device, determining the at least two target PRS resources among the PRS resources for transmitting the multiple PRSs of the access network device further comprises:

receiving a message from the location server that is used for indicating a preset condition that PRS resources whose measurement results are to be reported should meet;

determining the target PRS resources according to the message.

6. The positioning method according to claim 5, wherein determining the target PRS resources according to the message comprises:

determining that the target PRS resources are PRS resources corresponding to identifiers of the PRS resources whose measurement results are to be reported among the multiple PRS resources of the access network device, wherein the preset condition is identifiers of the PRS resources whose measurement results are to be reported; or, determining the target PRS resources according to a spatial arrangement order of the multiple PRS resources among the multiple PRS resources of the access network device; and screening, among the target PRS resources, target PRS resources whose attribute values meet a preset threshold, wherein the attribute value comprises at least one of the following: a signal-to-interference-plus-noise ratio, a signal-to-noise ratio, or a reference signal received power (RSRP), the preset condition is that attribute values of the PRS resources whose measurement results are to be reported meet the preset threshold; or, screening the target PRSs according to qualities of PRSs transmitted by the target PRS resources, wherein the preset condition is that the PRS resources whose measurement results are to be reported are not limited by spatial adjacency.

7. The positioning method according to claim 5, wherein the preset condition is that the PRS resources whose measurement results are to be reported are limited by spatial adjacency, before receiving the message from the location server, the method further comprises:

sending a message to the location server that is used for indicating that the terminal supports measurement of an angle of arrival (AoA) of a PRS resource.

8. The positioning method according to claim 1, before sending the measurement results of the target PRS resources to the location server, the method further comprises:

receiving a message from the location server that is used for indicating a reported number of the first PRS resource and/or a reported number of the second PRS resource.

9. The positioning method according to claim 1, before receiving the PRSs from the multiple access network devices, the method further comprises:

receiving a message from the location server that comprises configuration information of the multiple access network devices;

wherein the configuration information of the access network device comprises at least one of the following: a spatial arrangement order of the multiple PRS resources of the access network device, identifiers of the multiple PRS resources of the access network device, or angle information of the multiple PRS resources of the access network device, wherein the angle information of the PRS resource comprises a horizontal dimension angle of the PRS resource and/or a vertical dimension angle of the PRS resource.

10. A positioning method applied to a location server, wherein the positioning method comprises:

receiving measurement results of target positioning reference signal (PRS) resources of multiple access network devices from a terminal, wherein the target PRS resources of the access network device are determined by the terminal from multiple PRS resources of the access network device, wherein the target PRS resources comprise a first PRS resource and one or more second PRS resources, the first PRS resource is determined by the terminal among the multiple PRS resources of the access network device, the one or more second PRS resources are one or more PRS resources determined for the first PRS resource;

determining location information of the terminal according to the measurement results of the target PRS resources and angle information of the target PRS resources, wherein the angle information of the target PRS resources comprises a horizontal dimension angle of the target PRS resources and/or a vertical dimension angle of the target PRS resources.

11. The positioning method according to claim 10, before receiving the measurement results of the target PRS resources of the multiple access network devices from the terminal, the method further comprises:

sending a message to the terminal that is used for indicating a preset condition that PRS resources whose measurement results are to be reported should meet;

wherein the preset condition is identifiers of the PRS resources whose measurement results are to be reported, or the preset condition is that attribute values of the PRS resources whose measurement results are to be reported meet the preset threshold; or the preset condition is that the PRS resources whose measurement results are to be reported are not limited by spatial adjacency, or the preset condition is that the PRS resources whose measurement results are to be reported are limited by spatial adjacency; wherein the attribute value comprises at least one of the following: a signal-to-interference-plus-noise ratio, a signal-to-noise ratio, or a reference signal received power (RSRP).

12. The positioning method according to claim 11, wherein the preset condition is that the PRS resources whose measurement results are to be reported are limited by the spatial adjacency, before sending the message to the terminal, the method further comprises:

receiving a message from the terminal that is used for indicating that the terminal supports measurement of an angle of arrival (AoA) of a PRS resource.

13. The positioning method according to claim 10, before receiving the measurement results of the target PRS resources of the multiple access network devices from the terminal, the method further comprises:

sending a message to the terminal, that comprises configuration information of the multiple access network devices, the configuration information of the access network device comprises at least one of the following: a spatial arrangement order of multiple PRS resources of the access network device, identifiers of the multiple PRS resources of the access network device, or angle information of the multiple PRS resources of the access network device.

14. The positioning method according to claim 13, before sending the message to the terminal, the method further comprises:

receiving a message sent by the access network device that comprises the configuration information of the access network device.

15. A positioning method applied to an access network device, wherein the positioning method comprises:

sending a message to a location server that comprises configuration information of the access network device, the configuration information of the access network device comprises at least one of the following: a spatial arrangement order of multiple positioning reference signal (PRS) resources of the access network device, identifiers of the multiple PRS resources of the access network device, or angle information of the multiple PRS resources of the access network device, wherein the angle information of the PRS resources comprises a horizontal dimension angle of the PRS resources and/or a vertical dimension angle of the PRS resources; and sending multiple PRSs over the multiple PRS resources to a terminal, wherein the multiple PRSs are used for determining at least two target PRS resources, the at least two target PRS resources comprise a first PRS resource and one or more second PRS resources, the first PRS resource is determined by the terminal among the multiple PRS resources of the access network device, the one or more second PRS resources are one or more PRS resources determined for the first PRS resource.

16. A positioning apparatus applied to a terminal, wherein the positioning apparatus comprises a memory, a transceiver and a processor;

the memory is configured to store a computer program;

the transceiver is configured to transmit and receive data under control of the processor; and the processor is configured to read the computer program in the memory and perform the method according to claim 1.

17. A positioning apparatus applied to a location server, wherein the positioning apparatus comprises a memory, a transceiver and a processor;

the memory is configured to store a computer program;
the transceiver is configured to transmit and receive data under control of the processor; and
the processor is configured to read the computer program in the memory and perform the method according to claim 10.

18. A positioning apparatus applied to an access device, wherein the positioning apparatus comprises a memory, a transceiver and a processor;

the memory is configured to store a computer program;
the transceiver is configured to transmit and receive data under control of the processor; and
the processor is configured to read the computer program in the memory and perform the method according to claim 15.

* * * * *